United States Patent
Inamdar et al.

(10) Patent No.: US 10,225,209 B2
(45) Date of Patent: Mar. 5, 2019

(54) SYSTEM AND METHOD FOR INTERCEPTORS IN A MULTITENANT APPLICATION SERVER ENVIRONMENT

(71) Applicant: ORACLE INTERNATIONAL CORPORATION, Redwood Shores, CA (US)

(72) Inventors: Rajendra Inamdar, North Chelmsford, MA (US); Mahesh Kannan, San Jose, CA (US); Michael Cico, Hampton, NH (US); Sandeep Shrivastava, Westford, MA (US); Anthony Vlatas, Brookline, NH (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 387 days.

(21) Appl. No.: 15/064,761

(22) Filed: Mar. 9, 2016

(65) Prior Publication Data
US 2017/0019467 A1   Jan. 19, 2017

Related U.S. Application Data

(60) Provisional application No. 62/191,801, filed on Jul. 13, 2015.

(51) Int. Cl.
| | | |
|---|---|---|
| G06F 15/173 | (2006.01) | |
| H04L 12/911 | (2013.01) | |
| H04L 29/08 | (2006.01) | |

(52) U.S. Cl.
CPC ........ *H04L 47/783* (2013.01); *H04L 67/1097* (2013.01)

(58) Field of Classification Search
CPC .......................... H04L 47/783; H04L 67/1097
(Continued)

(56) References Cited

U.S. PATENT DOCUMENTS 7,519,181 B2 * 4/2009 Shaheen ............. H04L 63/0492
                                                       380/258
8,326,876 B1   12/2012 Venkataraman et al.
(Continued)

FOREIGN PATENT DOCUMENTS

| CN | 101639835 | 2/2010 |
| CN | 102170457 | 8/2011 |

(Continued)

OTHER PUBLICATIONS

United States Patent and Trademark Office, Office Action dated Nov. 29, 2017 for U.S. Appl. No. 14/748,094, 15 Pages.
(Continued)

*Primary Examiner* — Anthony Mejia
(74) *Attorney, Agent, or Firm* — Tucker Ellis LLP

(57) ABSTRACT

In accordance with an embodiment, described herein is a system and method for supporting interceptors in an application server environment. The method can provide, at one or more computers, including an application server environment executing thereon, a plurality of deployable resources which can be used within the application server environment, one or more partitions, wherein each partition provides an administrative and runtime subdivision of a domain, and an interceptor framework, the interceptor framework comprising a plurality of interceptors. The method can further select and trigger, on a call for a method invocation, an interceptor chosen from the plurality of interceptors. The method can interrupt, by the triggered interceptor, the call for the method invocation, wherein the interceptor is selected based at least upon the call for a method invocation.

18 Claims, 15 Drawing Sheets

(58) Field of Classification Search
USPC .......................................................... 709/226
See application file for complete search history.

(56) References Cited

U.S. PATENT DOCUMENTS

| | | | | |
|---|---|---|---|---|
| 8,392,564 | B1* | 3/2013 | Czajkowski | H04L 41/5051 |
| | | | | 709/226 |
| 8,495,067 | B2* | 7/2013 | Ripberger | H04L 67/1097 |
| | | | | 707/641 |
| 8,650,299 | B1* | 2/2014 | Huang | G06F 9/5077 |
| | | | | 709/226 |
| 8,688,923 | B2* | 4/2014 | Jacobs | G06F 11/0712 |
| | | | | 709/226 |
| 8,954,588 | B1* | 2/2015 | Bertz | H04L 67/28 |
| | | | | 709/226 |
| 9,621,668 | B2* | 4/2017 | Kamath | H04L 67/2842 |
| 2005/0271051 | A1* | 12/2005 | Holloway | H04L 29/06027 |
| | | | | 370/389 |
| 2006/0036747 | A1* | 2/2006 | Galvin, Jr. | H04L 67/14 |
| | | | | 709/228 |
| 2007/0220302 | A1* | 9/2007 | Cline | G06F 11/2035 |
| | | | | 714/4.1 |
| 2009/0275314 | A1* | 11/2009 | Cotevino | H04L 51/043 |
| | | | | 455/414.2 |
| 2009/0276771 | A1 | 11/2009 | Nickolov | |
| 2011/0238795 | A1* | 9/2011 | Bauer | H04L 67/2838 |
| | | | | 709/220 |
| 2011/0271005 | A1* | 11/2011 | Bharrat | H04L 61/1511 |
| | | | | 709/232 |
| 2012/0072597 | A1 | 3/2012 | Teather et al. | |
| 2013/0332577 | A1 | 12/2013 | Nakil | |
| 2013/0339470 | A1 | 12/2013 | Jeswani et al. | |
| 2013/0346967 | A1* | 12/2013 | Anand | G06F 9/45533 |
| | | | | 718/1 |
| 2014/0047150 | A1* | 2/2014 | Marietta | G06F 13/14 |
| | | | | 710/264 |
| 2014/0075019 | A1* | 3/2014 | Mordani | G06F 9/5072 |
| | | | | 709/224 |
| 2014/0075032 | A1* | 3/2014 | Vasudevan | H04L 41/50 |
| | | | | 709/226 |
| 2018/0115523 | A1* | 4/2018 | Subbarayan | G06F 15/18 |

FOREIGN PATENT DOCUMENTS

| | | |
|---|---|---|
| CN | 102333115 | 1/2012 |
| CN | 102571821 | 7/2012 |
| CN | 102932404 | 2/2013 |
| CN | 103455512 | 12/2013 |
| CN | 102609271 | 9/2014 |
| CN | 102571916 | 11/2015 |
| CN | 102932405 | 3/2016 |

OTHER PUBLICATIONS

European Search Report issued by European Patent Office for European Patent Application No. 15736357.3, dated Feb. 12, 2018, 9 pages.
United States Patent and Trademark Office, Office Action dated Apr. 27, 2017 for U.S. Appl. No. 14/748,094 , 12 Pages.
European Patent Office, Office Action for EP Application No. 15736357.3, dated Feb. 12, 2018, 9 pages.
Chinese Patent Office, Office Action for Chinese Application No. 201580003512.6 dated Jul. 20, 2018, 8 pages.

* cited by examiner

SYSTEM AND METHOD FOR INTERCEPTORS IN A MULTITENANT APPLICATION SERVER ENVIRONMENT

CLAIM OF PRIORITY AND CROSS-REFERENCE TO RELATED APPLICATIONS

This application claims the benefit of priority to U.S. Provisional application titled "SYSTEM AND METHOD FOR INTERCEPTORS IN A MULTITENANT APPLICATION SERVER ENVIRONMENT", Application No. 62/191,801, filed Jul. 13, 2015; and is related to U.S. patent application titled "SYSTEM AND METHOD FOR SUPPORTING MULTI-TENANCY IN AN APPLICATION SERVER, CLOUD, OR OTHER ENVIRONMENT", application Ser. No. 14/601,883, filed Jan. 21, 2015; and U.S. patent application titled "SYSTEM AND METHOD FOR SUPPORTING PARTITIONS IN A MULTITENANT APPLICATION SERVER ENVIRONMENT", application Ser. No. 14/748,094, filed Jun. 23, 2015, which applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to application servers and cloud environments, and are particularly related to a system and method for interceptors in a multitenant application server environment.

BACKGROUND

Application servers generally provide a managed environment within which software applications can be deployed and run. Cloud-based environments allow applications to run within and take advantage of the distributed resources provided by a cloud. Such environments can support large numbers of users or tenants, some of which may have specific requirements that are particular to that user or tenant. These are some examples of the type of environments in which embodiments of the present invention can be used.

SUMMARY

In accordance with an embodiment, described herein is a system and method for supporting interceptors in an application server environment. The method can provide, at one or more computers, including an application server environment executing thereon, a plurality of deployable resources which can be used within the application server environment, one or more partitions, wherein each partition provides an administrative and runtime subdivision of a domain, and an interceptor framework, the interceptor framework comprising a plurality of interceptors. The method can further select and trigger, on a call for a method invocation, an interceptor chosen from the plurality of interceptors. The method can interrupt, by the triggered interceptor, the call for the method invocation, wherein the interceptor is selected based at least upon the call for a method invocation.

DETAILED DESCRIPTION

In accordance with an embodiment, described herein is a system and method for supporting interceptors in an application server environment. The method can provide, at one or more computers, including an application server environment executing thereon, a plurality of deployable resources which can be used within the application server environment, one or more partitions, wherein each partition provides an administrative and runtime subdivision of a domain, and an interceptor framework, the interceptor framework comprising a plurality of interceptors. The method can further select and trigger, on a call for a method invocation, an interceptor chosen from the plurality of interceptors. The method can interrupt, by the triggered interceptor, the call for the method invocation, wherein the interceptor is selected based at least upon the call for a method invocation.

Application Server (e.g., Multi-Tenant, MT) Environment

Figure 1:
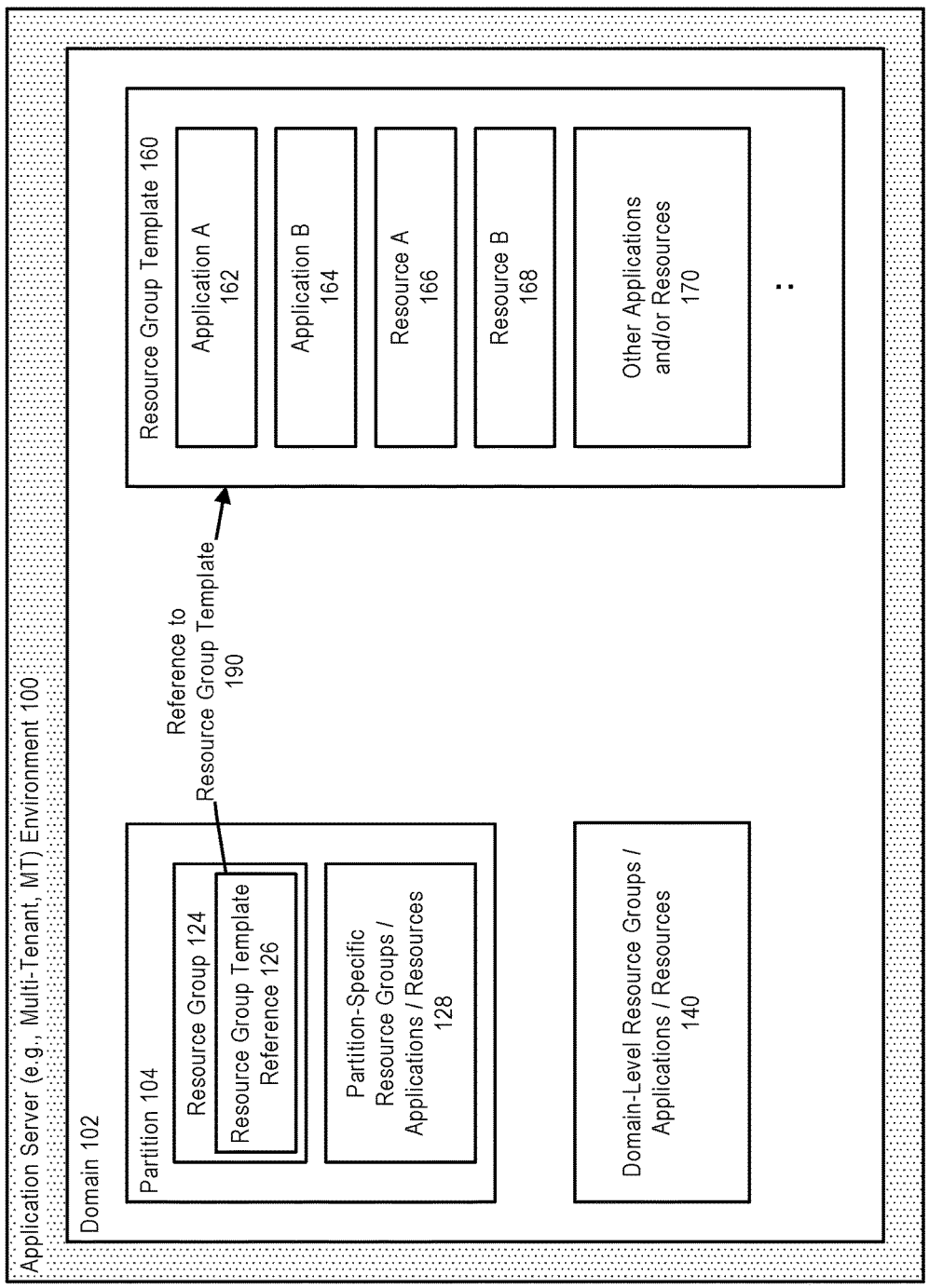
FIG. 1 illustrates a system for supporting multi-tenancy in an application server, cloud, or other environment, in accordance with an embodiment.

FIG. 1 illustrates a system for supporting multi-tenancy in an application server, cloud, or other environment, in accordance with an embodiment.

As illustrated in FIG. 1, in accordance with an embodiment, an application server (e.g., multi-tenant, MT) environment 100, or other computing environment which enables the deployment and execution of software applications, can be configured to include and operate according to a domain 102 configuration that is used at runtime to define an application server domain.

In accordance with an embodiment, the application server can include one or more partitions 104 that are defined for use at runtime. Each partition can be associated with a globally unique partition identifier (ID) and partition configuration, and can further include one or more resource groups 124, together with a reference to a resource group template 126 and/or partition-specific applications or resources 128. Domain-level resource groups, applications and/or resources 140 can also be defined at the domain level, optionally with a reference to a resource group template.

Each resource group template 160 can define one or more applications A 162, B 164, resources A 166, B 168, and/or other deployable applications or resources 170, and can be referenced by a resource group. For example, as illustrated in FIG. 1, resource group 124 in partition 104 can reference 190 resource group template 160.

Generally, a system administrator can define partitions, domain-level resource groups and resource group templates, and security realms; while a partition administrator can define aspects of their own partition, for example, by creating partition-level resource groups, deploying applications to the partition, or referencing specific realms for the partition.

Figure 2:
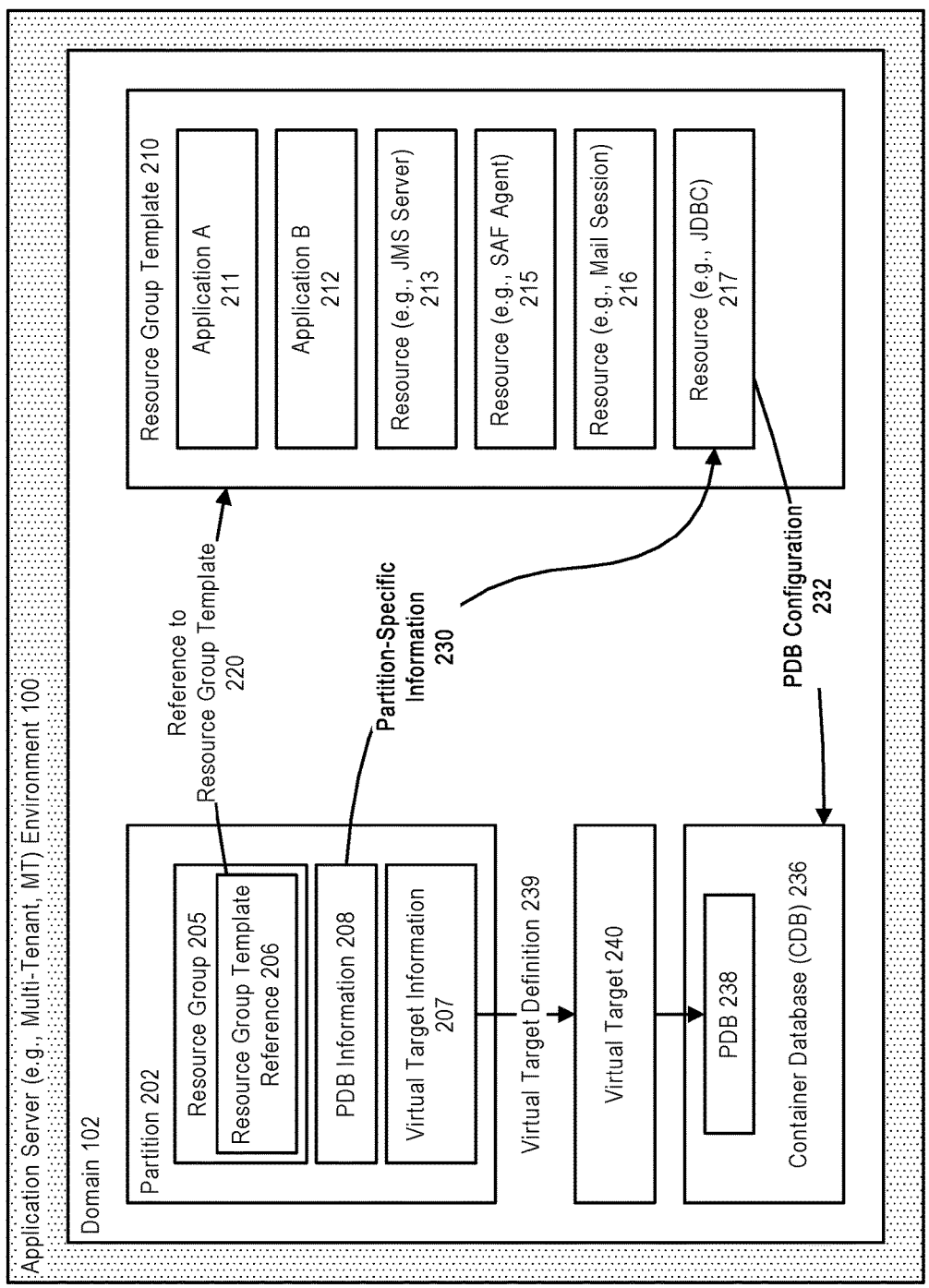
FIG. 2 further illustrates a system for supporting multi-tenancy in an application server, cloud, or other environment, in accordance with an embodiment.

FIG. 2 further illustrates a system for supporting multi-tenancy in an application server, cloud, or other environment, in accordance with an embodiment.

As illustrated in FIG. 2, in accordance with an embodiment, a partition 202 can include, for example, a resource group 205 which includes a reference 206 to a resource group template 210, a virtual target (e.g., virtual host) information 207, and a pluggable database (PDB) information 208. A resource group template (e.g., 210) can define, for example, a plurality of applications A 211 and B 212, together with resources such as a Java Message Server (JMS) server 213, store-and-forward (SAF) agent 215, mail session component 216, or Java Database Connectivity (JDBC) resource 217.

The resource group template illustrated in FIG. 2 is provided by way of example; in accordance with other embodiments, different types of resource group templates and elements can be provided.

In accordance with an embodiment, when a resource group within a partition (e.g., 202) references 220 a particular resource group template (e.g., 210), information associated with a particular partition can be used in combination with the referenced resource group template, to indicate a partition-specific information 230, for example a partition-specific PDB information. The partition-specific information can then be used by the application server to configure resources, for example a PDB resource, for use by the partition. For example, partition-specific PDB information associated with partition 202 can be used, by the application server, to configure 232 a container database (CDB) 236 with an appropriate PDB 238, for use by that partition.

Similarly, in accordance with an embodiment, a virtual target information associated with a particular partition can be used to define 239 a partition-specific virtual target 240, for use by the partition, e.g., baylandurgentcare.com, which can then be made accessible via a uniform resource locator (URL), e.g., http://baylandurgentcare.com.

Figure 3:
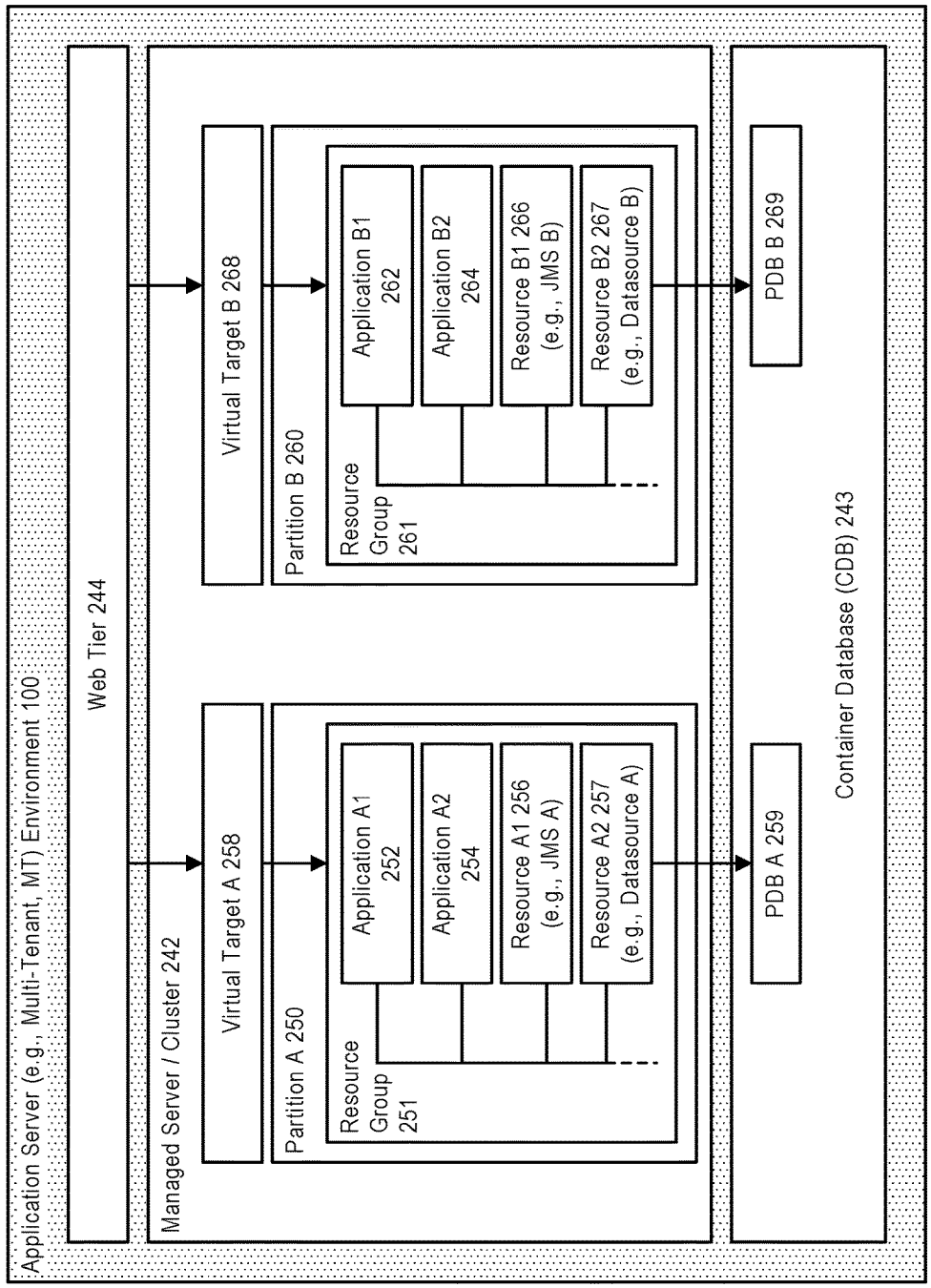
FIG. 3 further illustrates a system for supporting multi-tenancy in an application server, cloud, or other environment, in accordance with an embodiment.

FIG. 3 further illustrates a system for supporting multi-tenancy in an application server, cloud, or other environment, in accordance with an embodiment.

In accordance with an embodiment, a system configuration such as a config.xml configuration file, is used to define a partition, including configuration elements for resource groups associated with that partition, and/or other partition properties. Values can be specified per-partition using property name/value pairs.

In accordance with an embodiment, a plurality of partitions can be executed within a managed server/cluster 242, or a similar environment which can provide access to a CDB 243, and which are accessible via a web tier 244. This allows, for example, a domain or partition to be associated with one or more of the PDBs (of the CDB).

In accordance with an embodiment, each of the plurality of partitions, in this example partition A 250 and partition B 260, can be configured to include a plurality of resources associated with that partition. For example, partition A can be configured to include a resource group 251 which contains an application A1 252, application A2 254, and JMS A 256, together with a datasource A 257 associated with PDB A 259, wherein the partition is accessible via a virtual target A 258. Similarly, partition B 260 can be configured to include a resource group 261 which contains an application B1 262, application B2 264, and JMS B 266, together with a datasource B 267 associated with PDB B 269, wherein the partition is accessible via a virtual target B 268.

While several of the above examples illustrate use of CDB and PDBs, in accordance with other embodiments, other types of multi-tenant or non-multi-tenant databases can be supported, wherein a particular configuration can be provided for each partition, for example through the use of schemas, or the use of different databases.

Resources

In accordance with an embodiment, a resource is a system resource, application, or other resource or object that can be deployed to a domain of the environment. For example, in accordance with an embodiment, a resource can be an application, JMS, JDBC, JavaMail, WLDF, data source, or other system resource or other type of object that can be deployed to a server, cluster, or other application server target.

Partitions

In accordance with an embodiment, a partition is a runtime and administrative subdivision or slice of a domain that can be associated with a partition identifier (ID) and configuration, and can contain applications and/or refer to domain-wide resources through the use of resource groups and resource group templates.

Generally, a partition can contain its own applications, refer to domain wide applications via resource group templates, and have its own configuration. Partitionable entities can include resources, for example JMS, JDBC, JavaMail, WLDF resources, and other components, such as JNDI namespace, network traffic, work managers, and security policies and realms. In the context of a multi-tenant environment, the system can be configured to provide tenant access to the administrative and runtime aspects of partitions associated with a tenant.

In accordance with an embodiment, each resource group within a partition can optionally reference a resource group template. A partition can have multiple resource groups, and each of them can reference a resource group template. Each partition can define properties for configuration data that is not specified in the resource group templates to which the partition's resource groups refer. This enables the partition to act as a binding of deployable resources defined in a resource group template, to specific values for use with that partition. In some cases, a partition can override configuration information specified by a resource group template.

In accordance with an embodiment, a partition configuration, as defined for example by a config.xml configuration file, can include a plurality of configuration elements, for example: "partition", which contains the attributes and child elements that define the partition; "resource-group", which contains the applications and resources deployed to the partition; "resource-group-template", which contains applications and resources defined by that template; "jdbc-system-resource-override", which contains a database-specific service name, user name, and password; and "partition-properties", which contains property key values that can be used for macro replacement in resource group templates.

Upon startup, the system can use the information provided by the configuration file to generate partition-specific configuration elements for each resource, from the resource group template.

Resource Groups

In accordance with an embodiment, a resource group is a named, fully-qualified collection of deployable resources that can be defined either at a domain or partition level, and can reference a resource group template. The resources in a resource group are considered fully-qualified in that the administrator has provided all of the information needed to start or connect to those resources, for example the credentials for connecting to a data source, or the targeting information for an application.

A system administrator can declare resource groups at the domain level, or at the partition level. At the domain level, a resource group provides a convenient way to group related resources. The system can manage resources declared in a domain-level resource group the same as ungrouped resources, so that the resources can be started during system start-up, and stopped during system shut-down. An administrator can also stop, start, or remove a resource in a group individually, and can act on all the resources in a group implicitly by operating on the group. For example, stopping a resource group stops all of the resources in the group that are not already stopped; starting the resource group starts any resources in the group that are not already started; and removing the resource group removes all of the resources contained in the group.

At the partition level, a system or partition administrator can configure zero or more resource groups in a partition, subject to any security restrictions. For example, in a SaaS use case, various partition-level resource groups can refer to domain-level resource group templates; while in a PaaS use case, partition-level resource groups can be created that do not refer to resource group templates, but instead represent applications and their related resources that are to be made available within that partition only.

In accordance with an embodiment, resource grouping can be used to group together applications and the resources they use as a distinct administrative unit within the domain. For example, in the medical records (MedRec) application described below, a resource grouping defines the MedRec application and its resources. Multiple partitions can run the same MedRec resource group, each using a partition-specific configuration information, such that the applications that are part of each MedRec instance are made specific to each partition.

Resource Group Templates

In accordance with an embodiment, a resource group template is a collection of deployable resources that are defined at a domain level, that can be referenced from a resource group, and some of the information required to activate its resources may not be stored as part of the template itself, such that it supports the specification of partition level configuration. A domain can contain any number of resource group templates, each of which can include, for example, one or more related Java applications and the resources on which those applications depend. Some of the information about such resources may be the same across all partitions, while other information may vary from one partition to the next. Not all configuration need be specified at the domain level—partition level configuration can instead be specified in the resource group template through the use of macros, or property name/value pairs.

In accordance with an embodiment, a particular resource group template can be referenced by one or more resource groups. Generally, within any given partition, a resource group template can be referenced by one resource group at a time, i.e., not simultaneously by multiple resource groups within the same partition; however, it can be referenced at the same time by another resource group in a different partition. The object containing the resource group, e.g., the domain or partition, can use property name/value assignments to set the value of any tokens in the resource group template. When the system activates a resource group template using a referencing resource group, it can replace those tokens with values set in the resource group's containing object. In some cases, the system can also use statically-configured resource group templates and partitions to generate runtime configuration for each partition/template combination.

For example, in a SaaS use case, the system can activate the same applications and resources multiple times, including once for each partition that will use them. When an administrator defines a resource group template they can use tokens to represent the information that will be supplied elsewhere. For example, the username to use in connecting to a CRM-related data resource can be indicated in the resource group template as \${CRMDataUsername}.

Tenants

In accordance with an embodiment, in a multi-tenant environment, such as a multi-tenant (MT) application server environment, a tenant is an entity that can be represented by, or otherwise associated with, one or more partitions and/or one or more tenant-aware applications.

For example, tenants can represent distinct user organizations, such as different external companies, or different departments within a particular enterprise (e.g., HR and Finance departments), each of which can be associated with a different partition. A tenant globally unique identity (tenant ID) is the association of a particular user, at a particular moment in time, with a particular tenant. The system can derive which tenant a particular user belongs to from the user identity, for example by referring to a user identity store. The user identity enables the system to enforce those actions that a user is authorized to perform, including, but not limited to, which tenant the user may belong.

In accordance with an embodiment, the system enables isolation of the administration and runtime of different tenants from each other. For example, tenants can configure some behaviors of their applications, and resources to which they have access. The system can ensure that a particular tenant cannot administer artifacts belonging to another tenant; and, at runtime, that the applications working on behalf of a particular tenant refer only to resources associated with that tenant, and not to resources associated with other tenants.

In accordance with an embodiment, a tenant-unaware application is one that contains no logic dealing with tenants explicitly, such that any resources that the application uses may be accessible regardless of what user submitted a request to which the application is responding. In contrast, a tenant-aware application includes logic that explicitly deals with tenants. For example, based on a user's identity the application can derive the tenant to which the user belongs and use that information to access tenant-specific resources.

In accordance with an embodiment, the system enables users to deploy applications that are explicitly written to be tenant-aware, so that application developers can obtain the tenant ID of a current tenant. The tenant-aware application can then use the tenant ID to handle multiple tenants that are using a single instance of the application.

For example, the MedRec application, which supports a single doctor's office or hospital, can be exposed to two different partitions or tenants, e.g., a Bayland Urgent Care tenant, and a Valley Health tenant, each of which is able to access separate tenant-specific resources, such as separate PDBs, without changing the underlying application code.

Exemplary Domain Configuration and Multi-Tenant Environment

In accordance with an embodiment, applications can be deployed to a resource group template at the domain level, or to a resource group that is scoped to a partition or scoped to the domain. Application configuration can be overridden using deployment plans specified per-application, or per-partition. Deployment plans can also be specified as part of a resource group.

Figure 4:
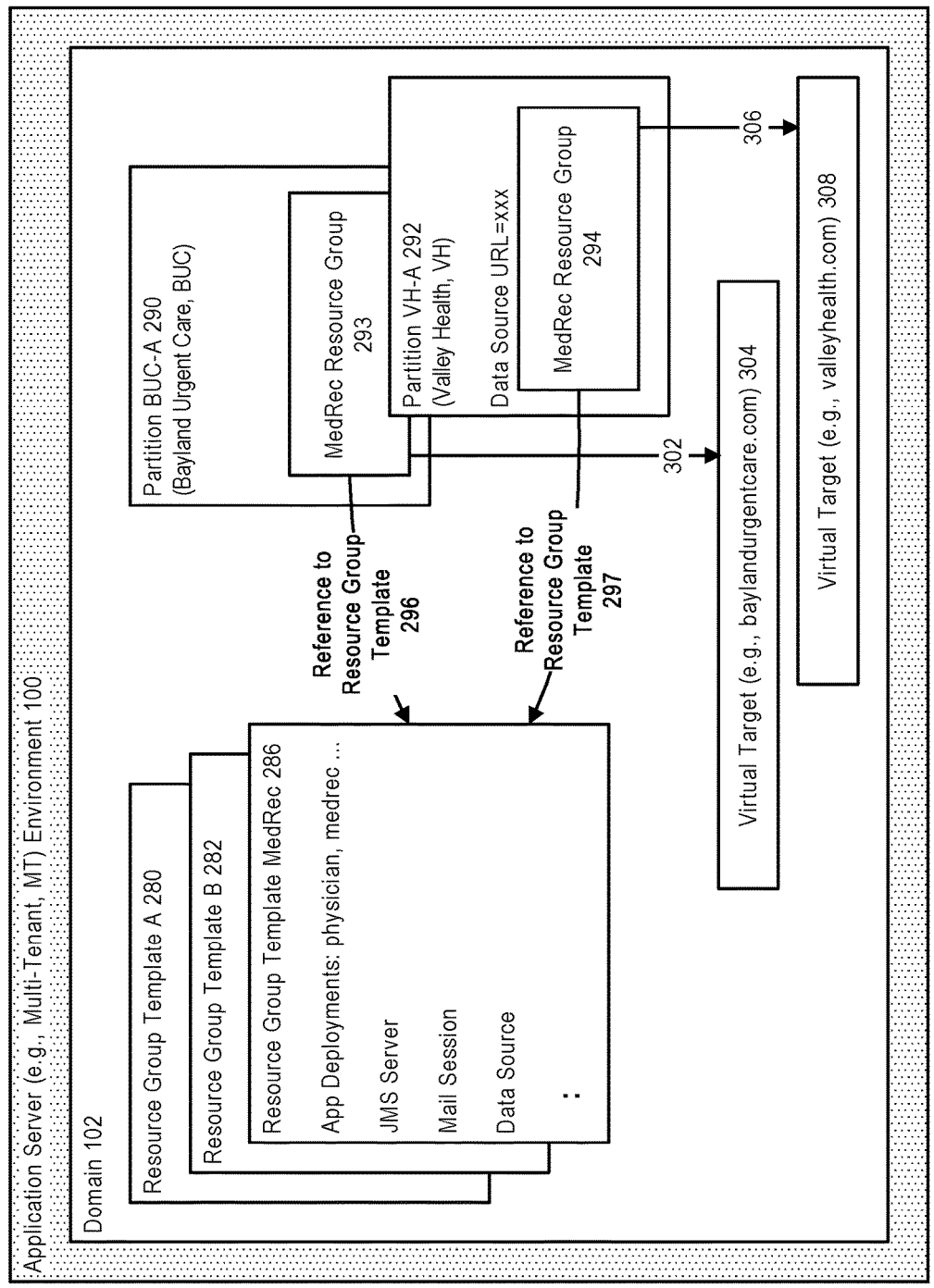
FIG. 4 illustrates a domain configuration for use with an exemplary multi-tenant environment, in accordance with an embodiment.

FIG. 4 illustrates a domain configuration for use with an exemplary multi-tenant environment, in accordance with an embodiment.

In accordance with an embodiment, when the system starts a partition, it creates virtual targets (e.g., virtual hosts) and connection pools, including one for each partition, to respective database instances, according to the provided configuration.

Typically, each resource group template can include one or more related applications and the resources on which those applications depend. Each partition can provide configuration data that is not specified in the resource group templates to which it refers, by providing a binding of the deployable resources in resource group templates to specific values associated with the partition; including, in some cases, overriding certain configuration information specified by the resource group template. This enables the system to activate an application represented by a resource group template differently for each partition, using the property values each partition has defined.

In some instances, a partition may contain resource groups that do not refer to resource group templates, or that directly define their own partition-scoped deployable resources. Applications and data sources that are defined within a partition are generally available only to that partition. Resources can be deployed so that they can be accessed from across partitions using partition:<partitionName>/<resource JNDI name>, or domain:<resource JNDI name>.

For example, a MedRec application can include a plurality of Java applications, a data source, a JMS server, and a mail session. To run the MedRec application for multiple tenants, the system administrator can define a single MedRec resource group template 286, declaring those deployable resources in the template.

In contrast to domain-level deployable resources, the deployable resources declared in a resource group template may not be fully configured in the template, or cannot be activated as-is, since they lack some configuration information.

For example, the MedRec resource group template may declare a data source used by the applications, but it may not specify a URL for connecting to the database. Partitions associated with different tenants, for example, partition BUC-A 290 (Bayland Urgent Care, BUC) and partition VH-A 292 (Valley Health, VH) can reference one or more resource group templates, by each including a MedRec resource group 293, 294 that references 296, 297 the MedRec resource group template. The reference can then be used to create 302, 306, the virtual targets/virtual hosts for each tenant, including a virtual host baylandurgentcare.com 304 associated with the BUC-A partition, for use by the Bayland Urgent Care tenant; and a virtual host valleyhealth.com 308 associated with the VH-A partition, for use by the Valley Health tenant.

Figure 5:
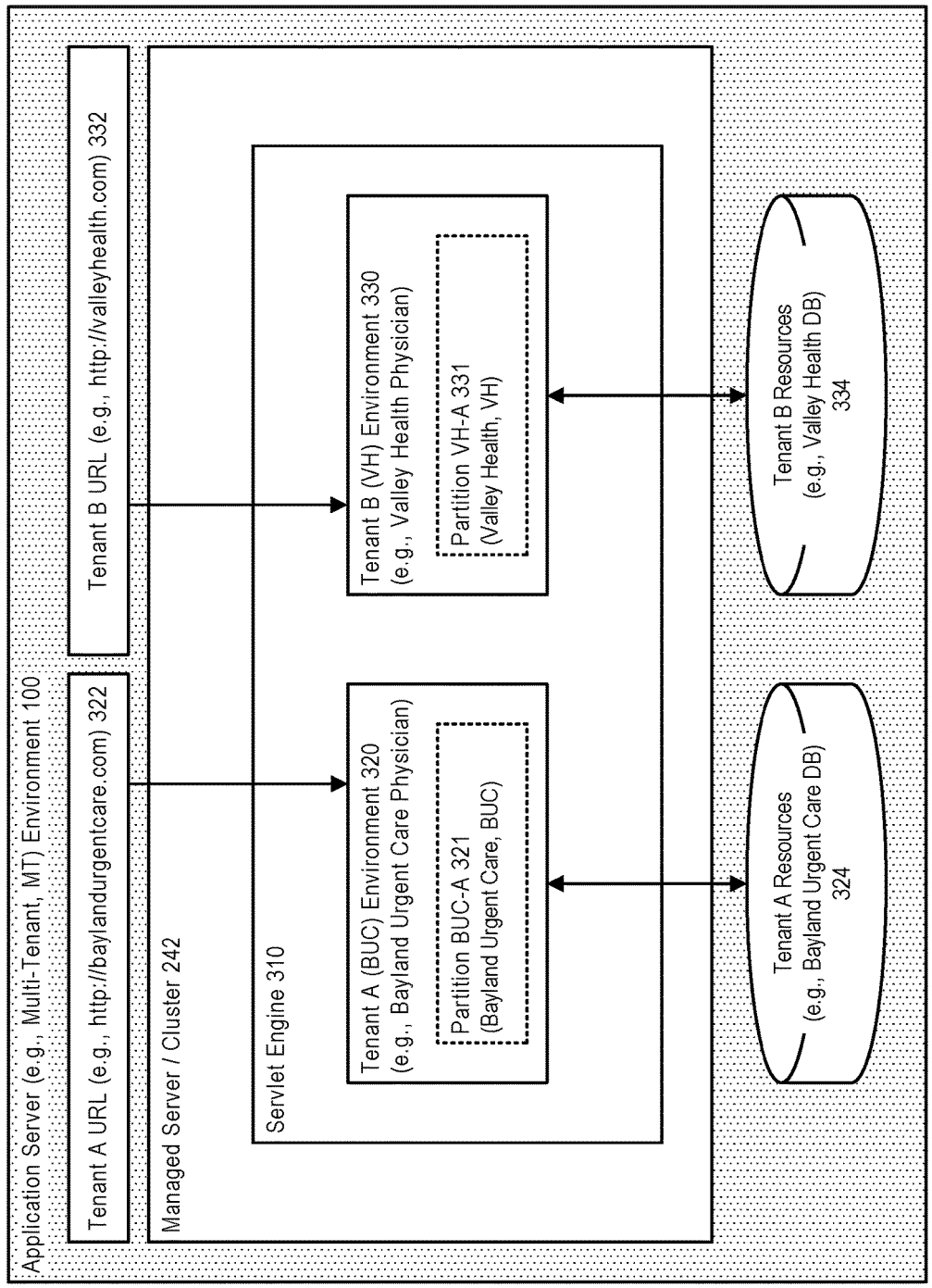
FIG. 5 further illustrates an exemplary multi-tenant environment, in accordance with an embodiment.

FIG. 5 further illustrates an exemplary multi-tenant environment, in accordance with an embodiment. As illustrated in FIG. 5, and continuing the example from above, in which two partitions reference the MedRec resource group template, in accordance with an embodiment, a servlet engine 310 can be used to support a plurality of tenant environments, in this example a Bayland Urgent Care Physician tenant environment 320, and a Valley Health Physician tenant environment 330.

In accordance with an embodiment, each partition 321, 331 can define a different virtual target on which to accept incoming traffic for that tenant environment, and a different URL 322, 332 for connecting to the partition and to its resources 324, 334, including in this example either a bayland urgent care database, or a valley health database respectively. The database instances can use compatible schemas, since the same application code will execute against both databases. When the system starts the partitions, it can create the virtual targets and connection pools to the respective database instances.

Rule-Based Elasticity

In accordance with an embodiment, an application server environment, such as a multitenant (MT) application server environment, can contain a cluster of servers which can include a number of managed servers running simultaneous and working together. By providing a cluster of managed servers, increased scalability as well as reliability can result. Additionally, having such a cluster of multiple manager servers running within the application server environment, can allow for increased performance, since, for example, partitions within an MT application server environment can call upon the server resources when needed.

However, with the increase in computing power needed to run current applications, even with multiple managed servers running within an application server environment, latency and poor performance can still occur when there are insufficient managed servers for the partitions to use. Additionally, it may be that the MT application server environment is over-populated with running servers, thus leading to a waste of compute resources. When these, or other situations occur, it is desirable to allow for a rule-based elasticity framework to provide for automatic scaling, either scaling up or scaling down, of the cluster of managed servers.

In accordance with an embodiment, a dynamic cluster can be included within an MT application server environment. The dynamic cluster contains multiple managed servers that are based on a server template, instead of being created by individual server configuration. For example, a dynamic cluster can contain multiple managed servers that are based on a single server template. This server template can form the basis for all the servers in the dynamic cluster so that each server does not need to be manually configured when expanding the cluster. However, there are still certain aspects of a managed server than can be individually configured.

In accordance with an embodiment, rule-based elasticity can allow for the implementation pre-existing or custom created policies by a domain administrator (also referred to herein variously as system administrator or global administrator) that can allow for automatic scaling operations of a dynamic cluster. A policy, in certain embodiments, can comprise a rule associated with an action. Once a policy has been triggered, it can provide for the automatic implementation of a scaling action at a targeted dynamic cluster. A managed server that is turned-on or created in the dynamic cluster can be based upon a server template. When additional server capacity is needed, a new managed server can be added (e.g., turned-on or created) to the dynamic cluster without having to first manually configure the new managed server. An administrator does not have to manually configure managed servers.

In addition to scaling dynamic clusters, rule-based elasticity can also be applied to other mechanisms within an application server environment. For example, a policy can be created to monitor partition-level traffic and, based upon a rule associated with the policy, adjust a work manager associated with the application server environment to either increase or decrease the threads allocated to a specific partition. In addition, rule-based elasticity can, on a more limited basis, be made available to partition administrators in order to allow partition administrators to monitor and configure their respective partitions according to selected or customized policies.

In accordance with an embodiment, an elasticity framework can be provided which can run various rules which can be selected or created by domain administrators, such as domain/global administrators. The elasticity framework can, in an example, leverage the watch/notifications provided by a diagnostic framework, such as WebLogic Diagnostic Framework (WLDF). WLDF system resources can be targeted to servers and/or clusters, such as managed servers running within a dynamic cluster. The watch rules associated with WLDF can be run within an administration server. The watch rules can be configured to use a variety of data points, such as runtime metrics from server and domain runtime MBean servers as well as log records and instrumentation events. Rule expression can use EL (expression language) syntax and when evaluated, return a Boolean value. The rules can be evaluated at configured schedules (calendar) while using metrics data. Rules based on log data can be evaluated as log records are generated. A number of actions can be associated with each watch rule. When a rule evaluates to true (Boolean value), an associated action, or actions, can be executed. Such actions can be provided by WLDF or by the elasticity framework. Actions provided by the elasticity framework can include, but are not limited to, scaling and tuning operations, which can be used to respond to changes in capacity needs.

A resource consumption management policy can provide additional metrics for monitoring purposes. Various other watch rules can be configured to account for these additional metrics provided by the resource consumption management policy.

Rule-Based Elasticity—Scaling Operations

Figure 6:
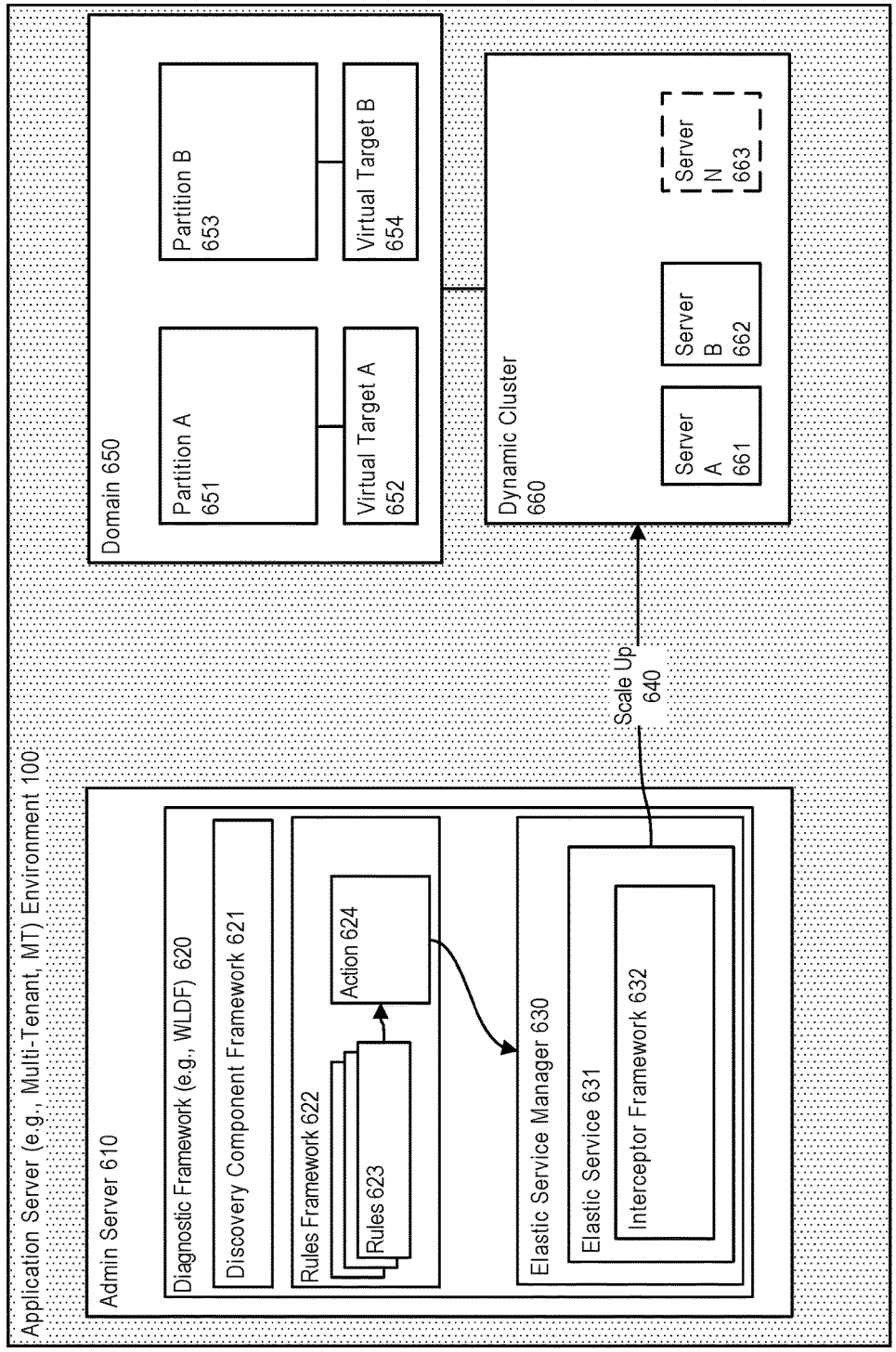
FIG. 6 illustrates rule-based elasticity within an application server environment, in accordance with an embodiment.

FIG. 6 illustrates rule-based elasticity within an application server environment, in accordance with an embodiment. More particularly, FIG. 6 illustrates a scaling operation performed on a cluster, based upon rule-based elasticity, within an application server environment. As shown in the Figure, an application server environment 600, such as a multitenant application server environment, can include an administration server 610, a domain 650, and a dynamic cluster 660. The administration server 610 can include a diagnostic framework 620. In accordance with an embodiment, the diagnostic framework can be a WebLogic Diagnostic Framework (WLDF). The diagnostic framework 620 can include a discovery component framework 621 (e.g., an Mbean discovery component framework, an action discovery component framework, and the like), a rules framework 622, and an elastic service manager 630. The rules framework 622 can include a number of rules 623 and an action module 624. The elastic service manager 630 can include an elastic service 631, which in turn can include an interceptor framework 632. The domain 650 can include partitions A and B, 651 and 653 respectively. Partitions A and B can be, respectively, associated with virtual targets A and B, 652 and 654 respectively. The dynamic cluster 660 can include a number of running managed servers, such as managed server A 661 and managed server B 662. In addition, the dynamic cluster can include a number of non-running managed serves, represented in the figure by managed server N 663.

In accordance with an embodiment, the diagnostic framework can contain, among the rules 623, watch rules associated with the diagnostic framework that can be run within the administration server 610. The watch rules can be configured to use a variety of data points, such as runtime metrics from server and domain runtime MBean servers as well as log records and instrumentation events. Rule expression can use EL (expression language) syntax and when evaluated, return a Boolean value. When a true value is returned by the rules 623, an associated action 624 can be triggered. The triggered action 624 can be associated with the elastic service manager in certain situations, and in turn the elastic service 631, such as when the triggered action is a scaling operation in the dynamic cluster 660.

For example, as depicted in FIG. 6, the diagnostic framework can, via watch rules, determine that the resources provided by the dynamic cluster (e.g., heap, threads) are insufficient to provide adequate service to the partitions within the domain (e.g., both partition A and partition B are placing heavy loads on the dynamic cluster). In such situation, the watch rule returns a value of true, and the associated action is a scale up operation. The scale up operation is then triggered within the elastic service manager, which provides the scale up elastic service. The scale up operation 640 is then triggered at the dynamic cluster, which can start managed server N.

In accordance with an embodiment, the discovery component framework can discover action services at runtime. The watch and notification configuration can also use the discovery component framework to obtain an instance of the service associated with an action type.

In accordance with an embodiment, the rules 623 can contain other types of rules in addition to watch rules. These other types of rules include, but are not limited to, smart rules and watch rules.

In accordance with an embodiment, smart rules can be pre-packaged predicates having a number of configurable parameters. Smart rules can allow an end user to create a watch rule by just specifying the values for these configurable parameters. A smart rule can be a function that return a Boolean. This can allow the function to be used as a predicate within an expression, either by itself or as a node within a more complex expression. When a method is identified as a smart rule, the rule can be an indicator to the framework and expression writers (through tools and documentation) that it encapsulates a more complex set of domain-specific knowledge. This can then be used as a standalone predicate within a watch rule expression.

For example, a simple function that computes the percentage of values within a vector that exceed a threshold would typically not be considered a smart rule; however, a rule that computes if the average JMS message backlog across a cluster over a period of time exceeds some threshold could be considered a smart rule.

Figure 7:
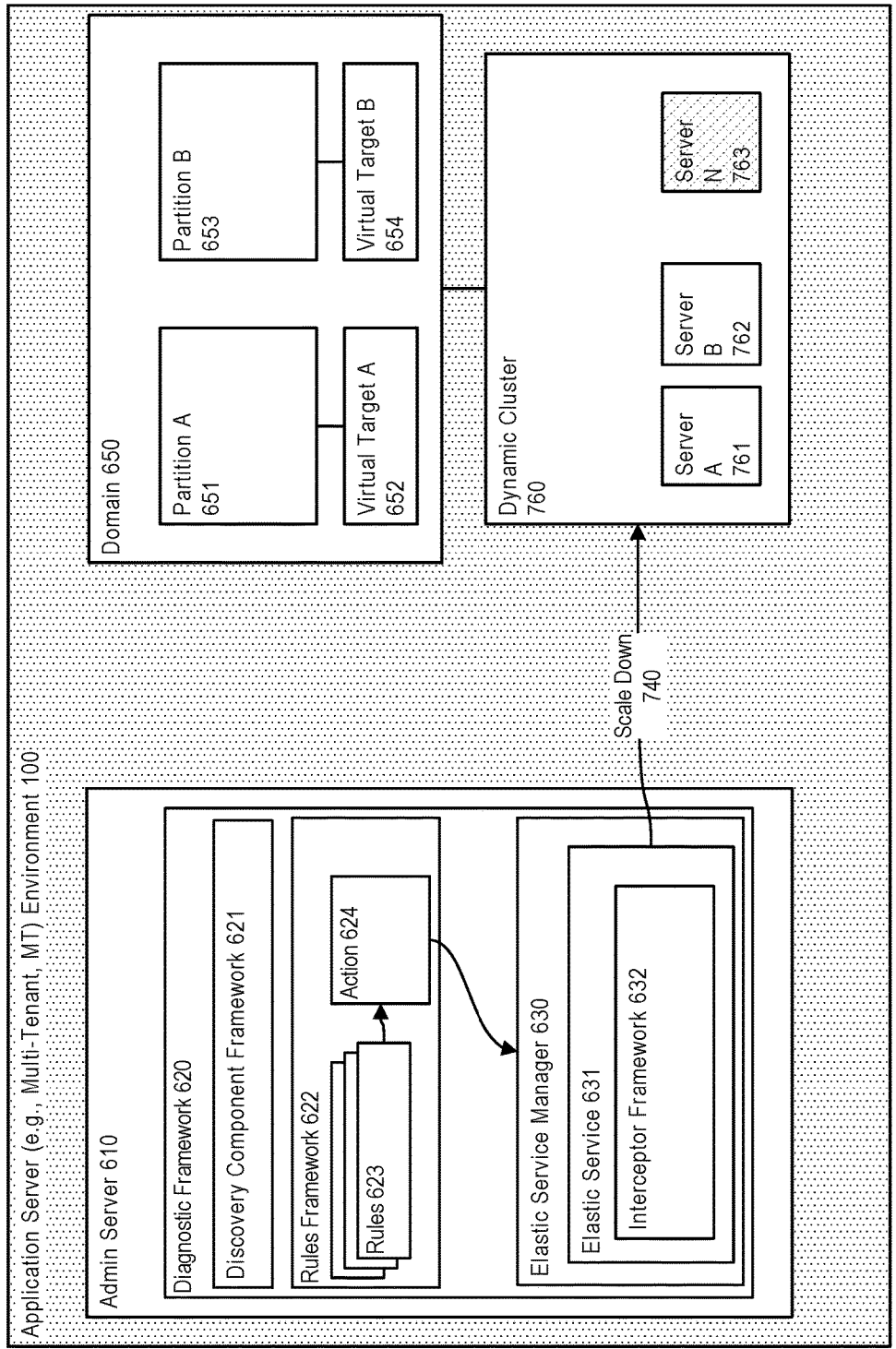
FIG. 7 illustrates rule-based elasticity within an application server environment, in accordance with an embodiment.

FIG. 7 illustrates rule-based elasticity within an application server environment, in accordance with an embodiment. More particularly, FIG. 7 illustrates a scaling operation performed on a dynamic cluster, based upon rule-based elasticity, within an application server environment. As shown in the Figure, an application server environment 600, such as a multitenant application server environment, can include an administration server 610, a domain 650, and a dynamic cluster 760. The administration server 610 can include a diagnostic framework 620. In accordance with an embodiment, the diagnostic framework can be a WebLogic Diagnostic Framework. The diagnostic framework 620 can include a discovery component framework 621, a rules framework 622, and an elastic service manager 630. The rules framework 622 can include a number of rules 623 and an action module 624. The elastic service manager 630 can include an elastic service 631, which in turn can include an interceptor framework 632. The domain 650 can include partitions A and B, 651 and 653 respectively. Partitions A and B can be, respectively, associated with virtual targets A and B, 652 and 654 respectively. The dynamic cluster 760 can include a number of running managed servers, such as managed server A 761, managed server B 762, and managed server N 763.

In accordance with an embodiment, the diagnostic framework can contain, among the rules 623, watch rules associated with the diagnostic framework that can be run within the administration server 610. The watch rules can be configured to use a variety of data points, such as runtime metrics from server and domain runtime MBean servers as well as log records and instrumentation events. Rule expression can use EL (expression language) syntax and when evaluated, return a Boolean value. When a true value is returned by the rules 623, an associated action 624 can be triggered. The triggered action 624 can be associated with the elastic service manager in certain situations, and in turn the elastic service 631, such as when the triggered action is a scaling operation in the dynamic cluster 760.

For example, as depicted in FIG. 7, the diagnostic framework can, via watch rules, determine that the resources provided by the dynamic cluster (e.g., heap, threads) are being wasted (i.e., the dynamic cluster is providing an excess of compute resources), or that the demands put on the dynamic cluster by partitions A and B are minimal. In such situations, the watch rule returns a value of true, and the associated action is a scale down operation. The scale down operation is then triggered within the elastic service manager, which provides the scale down elastic service. The scale down operation 740 is then triggered at the dynamic cluster, which can stop managed server N (as indicated by the shading in the figure).

Rule-Based Elasticity—Interceptors

A problem can arise in an application server environment employing a rule-based elasticity framework where the rules and actions allow for scaling operations within a dynamic cluster. Starting, adding, stopping or removing server instances in a cluster (i.e., scale-up and/or scale-down) is an aspect of a potential issue. Changing cluster sizes can affect other parts of the application server, and in some cases may also impact other layers in the system.

For example, in accordance with an embodiment, increasing the cluster size may result in large number of additional connections, such as JDBC (Java Database Connectivity), to be created, which can potentially overwhelm database capacity. Similarly, while scaling down, it may be necessary to coordinate with other application server subsystems so that work in progress has a chance to complete before the managed server is shut down. Additionally, it may be necessary to coordinate with a front-end (e.g., a traffic director, such as the Oracle Traffic Director) tier when new managed servers are added to the cluster during scale-up and removed during scale-down. Also, end users may potentially have customized interactions in order to interact with third party systems (e.g., virtualization managers and the like) and may need hooks to integrate with the elastic cluster management. Accordingly, an interceptor can provide the various other components of a system hooks related to a scaling operation before and after the scaling operation.

Figure 8:
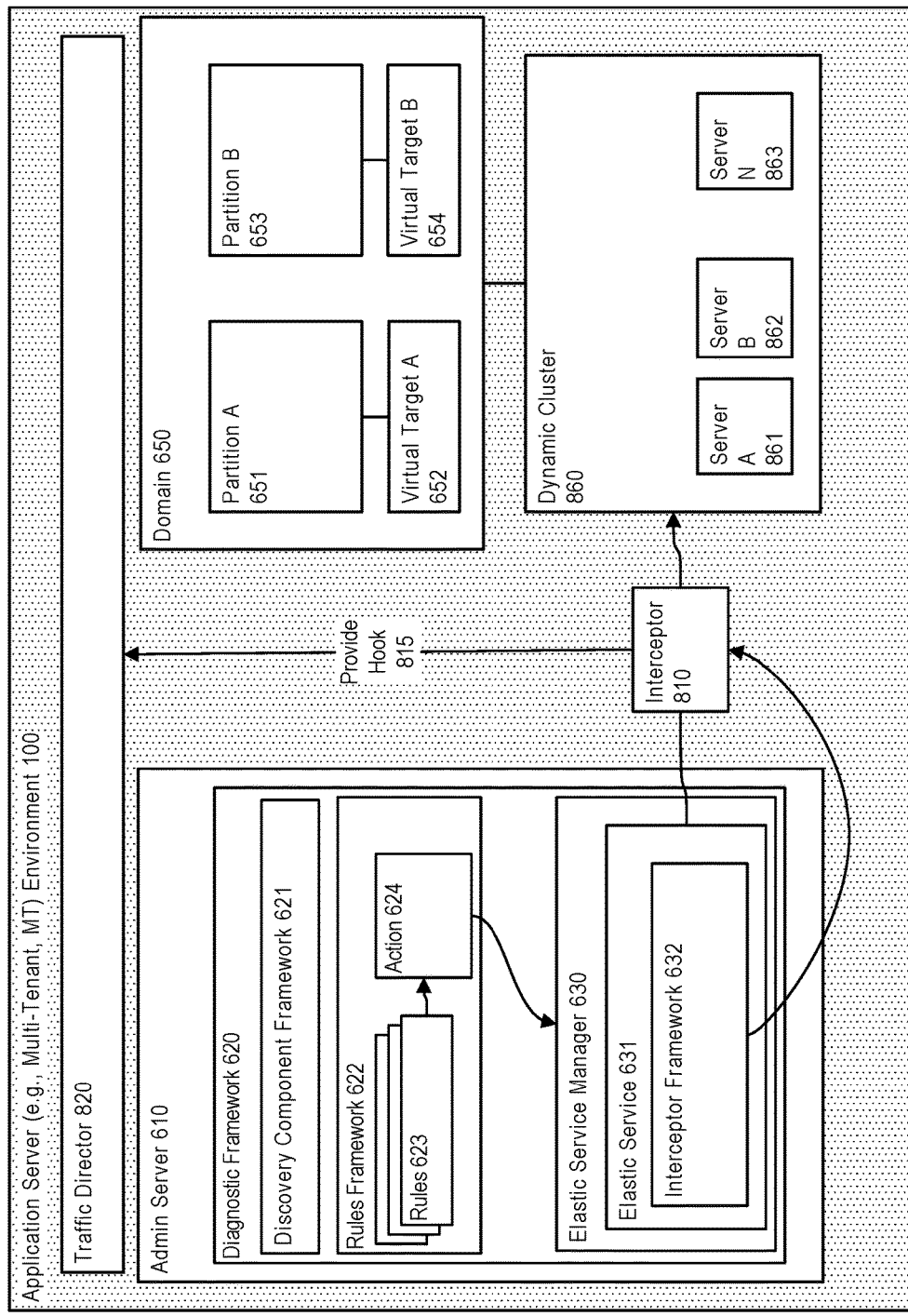
FIG. 8 illustrates the use of an interceptor framework within an application server environment during a rule-based elasticity scaling operation.

FIG. 8 illustrates the use of an interceptor framework within an application server environment during a rule-based elasticity scaling operation. As shown in the figure, an application server environment 600, such as a multitenant application server environment, can include an administration server 610, a domain 650, a dynamic cluster 860, and a traffic director 820. The administration server 610 can include a diagnostic framework 620. In accordance with an embodiment, the diagnostic framework can be a WebLogic Diagnostic Framework. The diagnostic framework 620 can include a discovery component framework 621, a rules framework 622, and an elastic service manager 630. The rules framework 622 can include a number of rules 623 and an action module 624. The elastic service manager 630 can include an elastic service 631, which in turn can include an interceptor framework 632. The domain 650 can include partitions A and B, 651 and 653 respectively. Partitions A and B can be, respectively, associated with virtual targets A and B, 652 and 654 respectively. The dynamic cluster 860 can include a number of running managed servers, such as managed server A 861, managed server B 862, and managed server N 863.

In accordance with an embodiment, the diagnostic framework can contain, among the rules 623, watch rules associated with the diagnostic framework that can be run within the administration server 610. The watch rules can be configured to use a variety of data points, such as runtime metrics from server and domain runtime MBean servers as well as log records and instrumentation events. Rule expression can use EL (expression language) syntax and when evaluated, return a Boolean value. When a true value is returned by the rules 623, an associated action 624 can be triggered. The triggered action 624 can be associated with the elastic service manager in certain situations, and in turn the elastic service 631, such as when the triggered action is a scaling operation (scale up/scale down) in the dynamic cluster 860.

In accordance with an embodiment, upon the signaling of a scaling action, an interceptor framework 632 can provide an interceptor 810 in order to provide hooks 815 for other components of the system.

In the embodiment depicted in FIG. 8, a traffic director interceptor (e.g., Oracle Traffic Director "OTD" interceptor) provides a hook for the traffic director 820 (e.g., Oracle Traffic Director) to intercept a scaling operation so the other components of the system components can prepare for and/or react to (and possibly veto) the scaling operation (such as, for example, currently processing transactions).

For example, as depicted in FIG. 8, the diagnostic framework can, via watch rules, determine that the resources provided by the dynamic cluster (e.g., heap, threads) are being wasted and/or are insufficient for the current demands by partitions A and B. In such situations, the watch rule returns a value of true, and the associated scaling action can be called. Before being implemented at the dynamic cluster, the scaling action can be intercepted by interceptor 810, provided by the interceptor framework 632. The interceptor can provide hooks 815 to the traffic director 820 before and after the scaling operation to ensure there are, for example, no interruptions in service. Such an interceptor can allow for assurances that the traffic director is informed of any new servers coming online, or currently running servers being taken offline.

In accordance with an embodiment, the interceptor can comprise an OTD scale-up interceptor, which can intercept a scaleUp operation. The OTD scale-up interceptor can pass information about the managed servers being added/started to the traffic director. For example, it may pass the cluster/host/port information about the managed servers to traffic director, so that traffic director can be aware of the coordinates of the newly started servers.

In accordance with an embodiment, the interceptor can comprise an OTD scale-down interceptor, which can intercept a scaleDown operation. The OTD scale-down interceptor can inform the traffic director about the imminent shutdown/scale down of the managed servers before the managed servers are shut down. This can help traffic director remove the managed servers from its view of the cluster so that it will not forward new traffic to the servers that are to be shut down.

In accordance with an embodiment, an application server, such as multitenant application server, employing a rules based elasticity (i.e., rules-based scale-up and scale-down of managed servers) can leverage the interceptors (i.e., an interceptor framework). A number of interceptors can implement contracts defined by an interceptor framework. These interceptor implementations can be used by an elasticity framework to manage interactions with various subsystems, such as WebLogic subsystems, as well as external components during scaling operations (i.e., scale-up or scale-down in a cluster).

Figure 9:
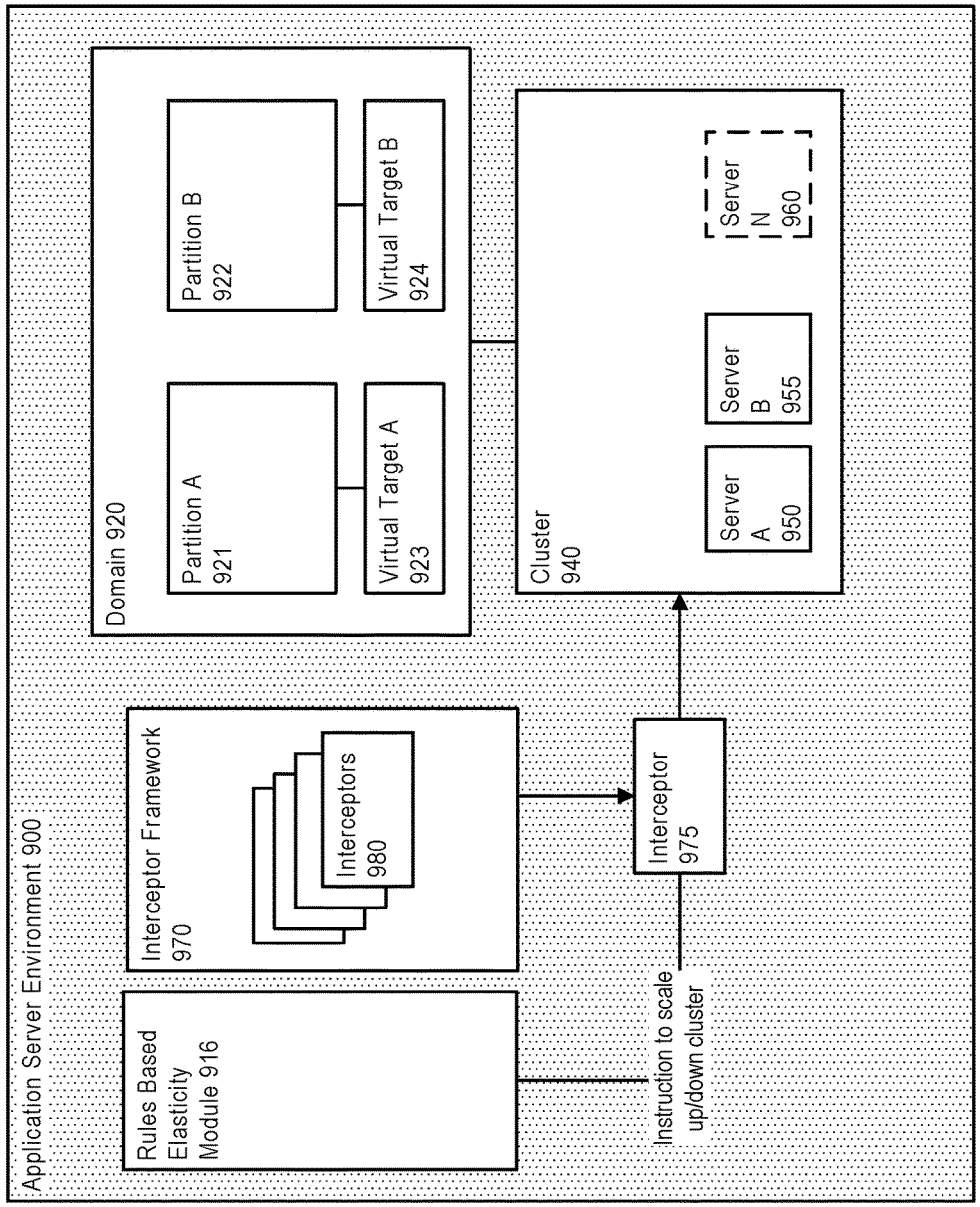
FIG. 9 illustrates supporting interceptors within an application server environment, in accordance with an embodiment.

FIG. 9 illustrates supporting interceptors within an application server environment, in accordance with an embodiment. The system of FIG. 9 shows an application server environment 900, which includes a rules based elasticity module 916, domain 930, and cluster 940. The domain 920 includes partitions A and B, 921 and 922 respectively, and virtual targets A and B, 923 and 924 respectively. The cluster 940 includes managed servers A, B, and N, 950, 955, and 960. Sever N 960 is shown as a dashed line indicating that sever N can be the server changed (created/started/shut down) as a result of an instruction received from the rules based elasticity module 916. The application server environment additionally includes interceptor framework 970, which contains a plurality of interceptors 980.

In accordance with an embodiment, interceptor framework can provide a chosen interceptor 975 based upon the instruction from the rules based elasticity module 916 to the cluster 940.

In accordance with an embodiment, several different interceptors are available. These include, but are not limited to, data-source interceptor, JMS interceptor, HA interceptor, OTD interceptor, and script interceptor.

Rule-Based Elasticity—Data-Source Interceptor

In accordance with an embodiment, a data-source interceptor can intercept dynamic cluster scale-up operations in order to validate that the scaling operation will not overload database.

Figure 10:
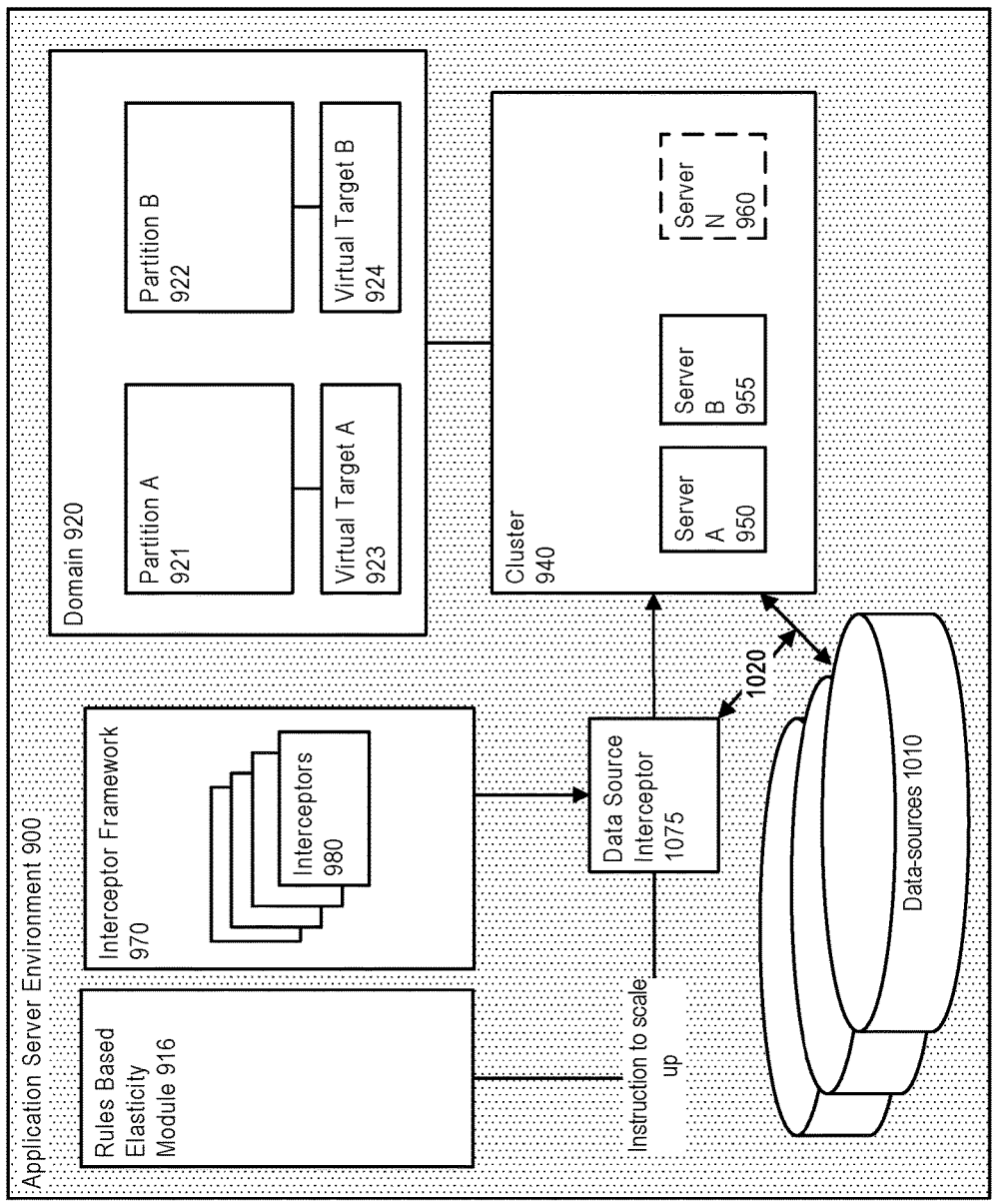
FIG. 10 illustrates supporting interceptors within an application server environment, in accordance with an embodiment.

FIG. 10 illustrates supporting interceptors within an application server environment 900, in accordance with an embodiment. More specifically, FIG. 10 depicts supporting a data-source interceptor within an application server environment. The system of FIG. 10 shows an application server environment 900, which includes a rules based elasticity module 916, domain 930, and cluster 940. The domain 920 includes partitions A and B, 921 and 922 respectively, and virtual targets A and B, 923 and 924 respectively. The cluster 940 includes managed servers A, B, and N, 950, 955, and 960. Sever N 960 is shown as a dashed line indicating that sever N can be the server changed (created/started/shut down) as a result of an instruction received from the rules based elasticity module 916. The application server environment additionally includes interceptor framework 970, which contains a plurality of interceptors 980. The application server environment can additionally host a number of data-sources 1010.

In accordance with an embodiment, interceptor framework can provide a data-source interceptor 1075 based upon a scale-up instruction from the rules based elasticity module 916 to the cluster 940.

In accordance with an embodiment, during a scale-up, new servers in a cluster will be started. In the depicted example of FIG. 10, this is server N 960. If data-sources (e.g., database) 1010 are targeted to the cluster, this can result in creation of additional connections to the databases. This may result in exceeding database capacities. The data-source interceptor will attempt to limit 1020 the total number of connections created from the domain to the databases so that their capacities are not exceeded.

In accordance with an embodiment, it is possible that connections can be created from outside the application server environment 900 (e.g., with other application server environments) to the same database. However, the interceptors within an application server environment do not have visibility to such connections.

In accordance with an embodiment, a data-source interceptor can intercept a scale up instruction (e.g., scaleUp method) and add a command to the workflow being constructed. The constructed workflow can be scheduled for execution with a framework (e.g., orchestration framework). When the framework executes the workflow, the command produced by the data-source interceptor can perform validation to limit potential number of data-source connections created from the domain to specified quotas.

In accordance with an embodiment, a data-source interceptor may be configured with an object, such as an ElasticDatasourceInterceptorMBean. The data-source configuration can provide a way to specify database capacities in term of number of connections (i.e., an approximate measurement of the database capacity). The application server environment can contain several data sources (e.g., global and partition scoped JDBC system resources as well as application scoped data-sources). A connection URL specified by a data-source configuration can identify the database it will connect to. A data-source interceptor configuration can specify a quota corresponding to a group of database URLs which can be the maximum total number of connections that may be created from the environment.

In accordance with an embodiment, quotas can be configured for the data-source interceptor to take effect during scaling operations. Multiple ElasticDatasourceInterceptorMBeans can be configured to handle multiple databases.

In accordance with an embodiment, if data-sources are targeted to the cluster being scaled up, servers that are started may create additional data-source connections. In such case (and if quotas are configured), the data-source interceptor can compute a maximum number of projected connections that may be created on groups of databases if additional server(s) are added to the cluster. If the configured quota is not violated, the interceptor can allow the scaling operation to proceed (subject to approval by subsequent interceptors, if any). If any configured quota is violated, the data-source interceptor can be configured to throw an exception to veto the scaling operation. Finally, a log message can be written to a log during the execution of the data-source interceptor to provide visibility into the data-source interceptor's success or failure.

Rule-Based Elasticity—JMS Interceptor

In accordance with an embodiment, a JMS interceptor can intercept cluster scale-down operation to ensure orderly quiescence of the JMS subsystem on the server(s) being shut down.

Figure 11:
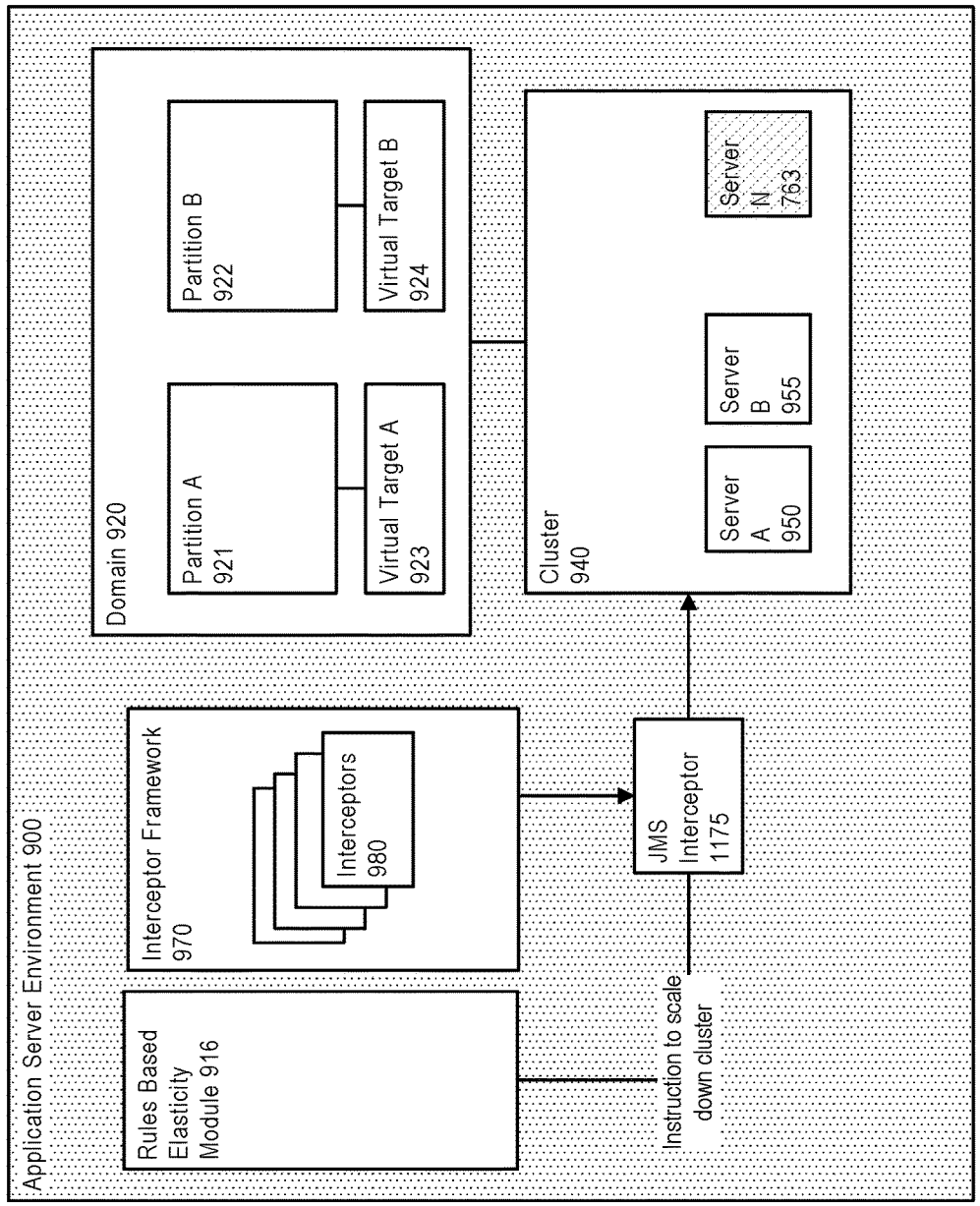
FIG. 11 illustrates supporting interceptors within an application server environment, in accordance with an embodiment.

FIG. 11 illustrates supporting interceptors within an application server environment, in accordance with an embodiment. More specifically, FIG. 11 depicts supporting a JMS interceptor within an application server environment. The system of FIG. 11 shows an application server environment 900, which includes a rules based elasticity module 916, domain 930, and cluster 940. The domain 920 includes partitions A and B, 921 and 922 respectively, and virtual targets A and B, 923 and 924 respectively. The cluster 940 includes managed servers A, B, and N, 950, 955, and 960. Sever N 960 is shown as a dashed line indicating that sever N can be the server changed (created/started/shut down) as a result of an instruction received from the rules based elasticity module 916. The application server environment additionally includes interceptor framework 970, which contains a plurality of interceptors 980.

In accordance with an embodiment, interceptor framework can provide a JMS interceptor 1175 based upon a scale-down instruction from the rules based elasticity module 916 to the cluster 940. The JMS interceptor can intercept a cluster scale-down operation to ensure orderly quiescence of the JMS subsystem on the server(s) being shut down.

Script (Scripted Workflow Item) Interceptor

In accordance with an embodiment, script interceptors may be configured to intercept eligible operations on certain service types. For example, script interceptors can be used to intercept dynamic cluster scale-up and scale-down operations. Script interceptors can also be used, for example, to intercept additional operations, such as lifecycle operations. Script interceptors can also be used to invoke arbitrary scripts before and/or after the intercepted operation to help integration with third-party systems.

Figure 12:
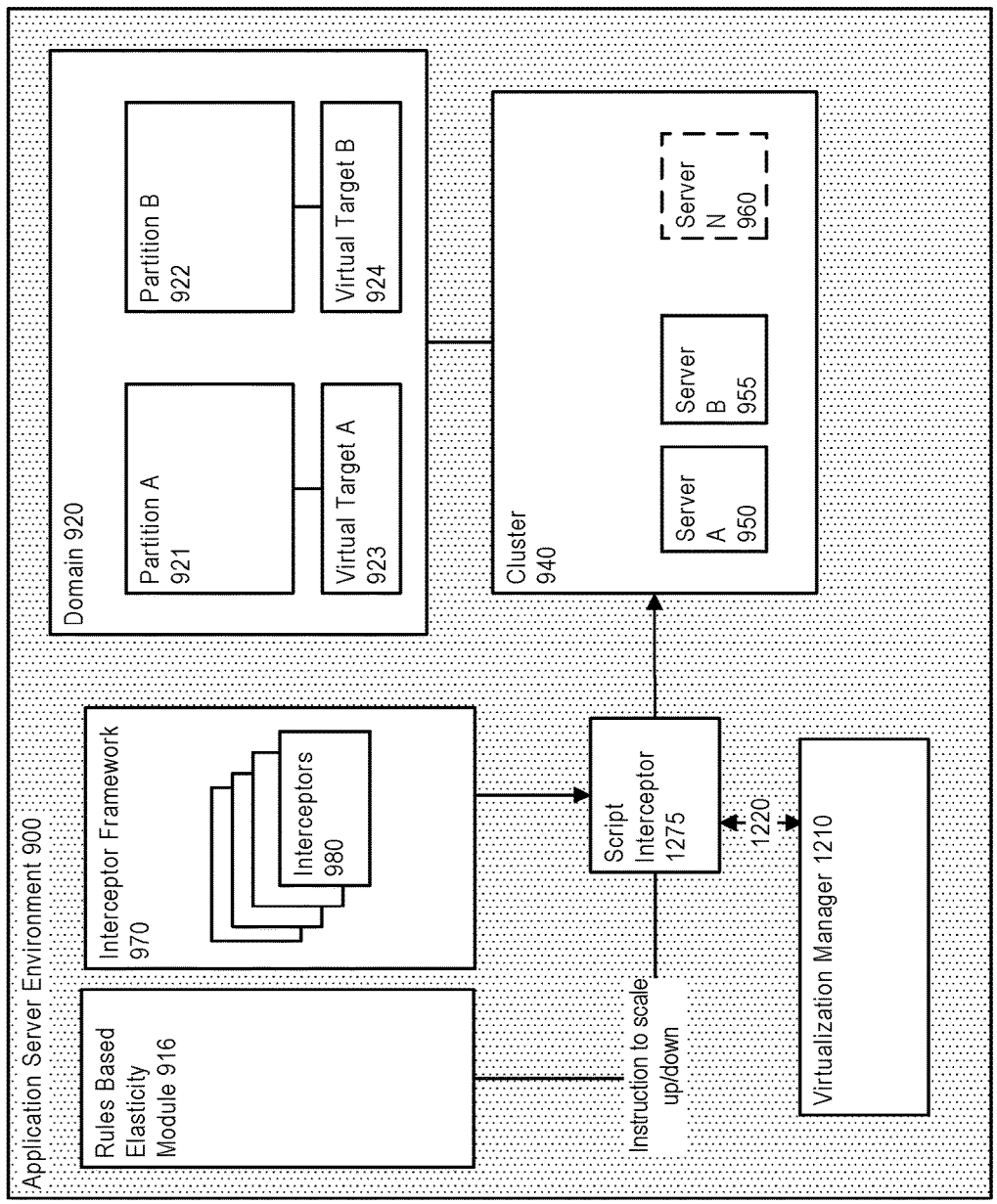
FIG. 12 illustrates supporting interceptors within an application server environment, in accordance with an embodiment.

FIG. 12 illustrates supporting interceptors within an application server environment, in accordance with an embodiment. More specifically, FIG. 12 depicts supporting a script interceptor within an application server environment. The system of FIG. 12 shows an application server environment 900, which includes a rules based elasticity module 916, domain 930, and cluster 940. The domain 920 includes partitions A and B, 921 and 922 respectively, and virtual targets A and B, 923 and 924 respectively. The cluster 940 includes managed servers A, B, and N, 950, 955, and 960. Sever N 960 is shown as a dashed line indicating that sever N can be the server changed (created/started/shut down) as a result of an instruction received from the rules based elasticity module 916. The application server environment additionally includes interceptor framework 970, which contains a plurality of interceptors 980.

In accordance with an embodiment, interceptor framework can provide a script interceptor 1275 based upon a scaling instruction from the rules based elasticity module 916 to the cluster 940. The script interceptors can be used to intercept dynamic cluster scale-up and scale-down operations to coordinate 1220 with a virtualization manager 1210 to provision one or more new virtual machines. Script interceptors can also be used to invoke arbitrary scripts before and/or after the intercepted operation to help integration with third-party systems.

In accordance with an embodiment, when performing scaling operations, additional systems can become involved. For example, before scaling up a dynamic cluster, it may be necessary to coordinate with a virtualization manager to provision a new VM, configure a machine. A script interceptor can provide hooks to execute scripts before and/or after an operation which is intercepted. Scripts specified with the ScriptInterceptor configuration can be executed as forked processes. If multiple steps need to be performed before and/or after an operation, there may be multiple script interceptors in the chain for each step.

In accordance with an embodiment, because these scripts can run for a long duration, the scripts specified in these interceptors can be executed as a workflow command. When a script interceptor is invoked as a result of invoking a scaleUp or a scaleDown operation, the script interceptor can add workflow commands to the workflow being constructed. This workflow can be scheduled for execution with the Orchestration framework. When the workflow executes, the workflow commands added by the script interceptor will invoke configured scripts to perform integration activities.

In accordance with an embodiment, script interceptors can create and add commands to a workflow which can execute scripts and executable programs before and/or after an intercepted operation. Script interceptors can also execute one or more scripts with multiple instances of script interceptors. Script interceptors can provide the ability to use script based interceptors with interceptors implemented in Java Pass dynamic/computed parameters to executed scripts as environmental variables. As well, script interceptors can extract dynamic/computed results from executed scripts (which may be passed to other interceptors down the chain).

In accordance with an embodiment, a script interceptor can specify scripts that can be executed while intercepting an operation. A pre-process script can optionally be executed before the execution of the intercepted operation. If the script fails (i.e., returns non-zero status), the script interceptor can throw an exception. If an error handler script is configured, it will be invoked before throwing the exception.

A specified script can also, optionally, be provided that can be executed after successful execution of the intercepted operation. If the script fails (i.e., returns non-zero status), the script interceptor can execute a handler script and throw an exception.

In accordance with an embodiment, a script interceptor can provide a workflow item which can execute a specified script. The workflow item when executed can fork a sub-process and can execute the specified script. The work item implementation can marshal the context data in the form of name/value pairs which can be passed to the executed script as environmental variables.

In accordance with an embodiment, an executed script may compute some data which may need to be passed to a next stage. For example, a script may provision a virtual machine and the assigned IP address may need to be passed to a subsequent script. To allow such exchange, a variable can be provided that can be passed to the script. Such a variable can specify a location of the file where the script is expected to write name/value pairs as a properties file. After successful script execution, an output file can be read to construct an object which can be used to pass data to a next script in the form of environmental variables. The contents of the properties file can be merged with properties which may have been created in previous steps. In other words, the properties in the file can overwrite values of properties if they already existed. If they did not exist before, the properties created and initialized with values in the file.

Script interceptors, in accordance with an embodiment, can be configured via a ScriptInterceptorMBean. In any given application server environment, there may be multiple instances of such mbeans corresponding to multiple scripts that may be involved in an interceptor chain for an operation. A ScriptInterceptorMBean can specify optional pre-process, post-process and error handler scripts, each with a ScriptMBean.

In accordance with an embodiment, during script interceptor execution, a script interceptor can add pre-process and/or post-process work units in the generated workflow depending on the interceptor's configuration. There may, as well, be multiple script interceptors configured to intercept a method. In such case, the pre-processor work units can appear before the work unit generated to execute the intercepted operation. The post-processor work units can appear after the work unit generated to execute the intercepted operation.

Figure 13:
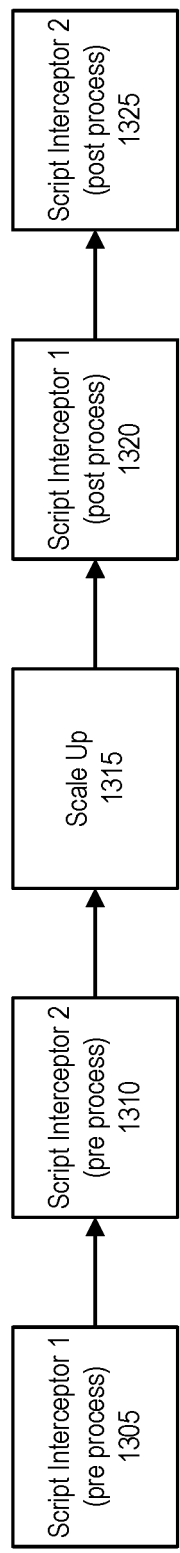
FIG. 13 illustrates an exemplary flow diagram of a work flow for script interceptors configured to intercept a scale up action.

FIG. 13 illustrates an exemplary flow diagram of a work flow for script interceptors configured to intercept a scale up action.

As shown in FIG. 13, in accordance with an embodiment, script interceptors 1 and 2 and configured to intercept a scale up action 1315. Script interceptor 1 ("S1") comprises both a pre process 1305 ("S1-pre") as well as a post process 1320 ("S1-post"). Script interceptor 2 ("S2") likewise comprises both a pre process 1310 ("S2-pre") and a post process 1325 ("S2-post"). In accordance with an embodiment, S1-pre and S2-pre can be generated based on pre-processor configuration of S1 and S2. Similarly, S1-post and S2-post can be generated based on post-processor configuration of S1 and S2.

In accordance with an embodiment, participating scripts may need to generate temporary files which can be removed when not needed. The interceptor framework can create a new temporary directory for every intercepted invocation before starting execution of the interceptor chain. This directory can be deleted by the interceptor framework after the interceptor chain execution completes. Scripts executed by script interceptors may utilize this directory to generate temporary files.

In accordance with an embodiment, a HA interceptor can intercept dynamic cluster scale-down operations to ensure that the server(s) being shut down do not participate in certain HA activities.

A OTD (Oracle Traffic Director) interceptor can intercept dynamic cluster scale-up and scale-down operations to ensure that OTD is informed of new server(s) coming up, or server(s) that will be shut down.

In accordance with an embodiment, script interceptors may be configured to intercept eligible operations on certain service types. In particular, script interceptors can be used to intercept dynamic cluster scale-up and scale-down operations. Script interceptors can also be used to invoke arbitrary scripts before and/or after the intercepted operation to help integration with third-party systems.

Ordered Interceptors

In accordance with an embodiment, interceptors can be provided that are configured to intercept method calls to HK2 (Hundred-Kilobyte Kernel) services.

In a situation where multiple interceptors (e.g., in an interceptor chain) are configured to intercept a method call, an order can be provided for.

In accordance with an embodiment, the order in which an interceptor chain can be altered using a rank annotation.

Figure 14:
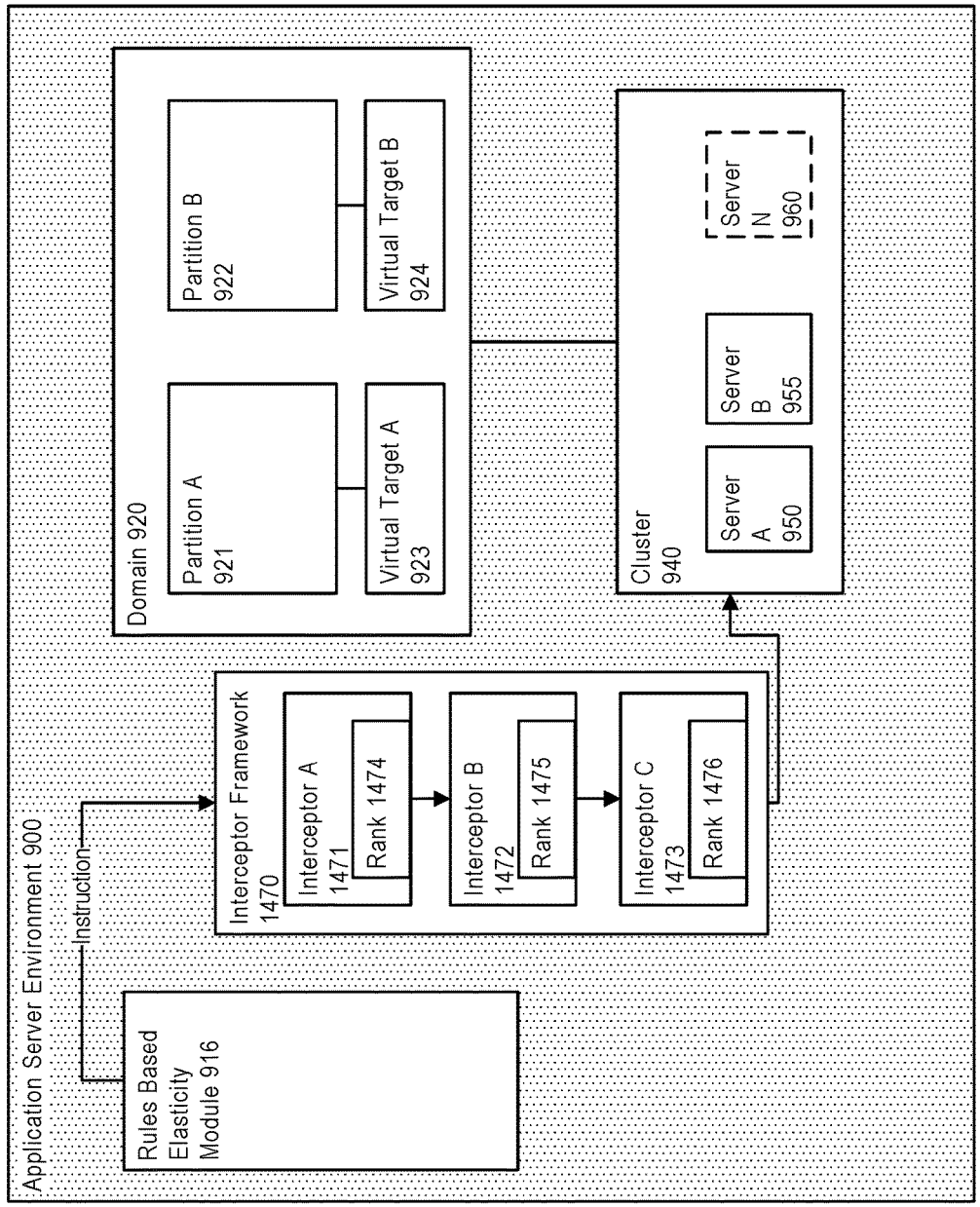
FIG. 14 illustrates supporting interceptors within an application server environment, in accordance with an embodiment.

FIG. 14 illustrates supporting interceptors within an application server environment, in accordance with an embodiment. More specifically, FIG. 14 depicts supporting a chain of ranked interceptors within an application server environment. The system of FIG. 13 shows an application server environment 900, which includes a rules based elasticity module 916, domain 930, and cluster 940. The domain 920 includes partitions A and B, 921 and 922 respectively, and virtual targets A and B, 923 and 924 respectively. The cluster 940 includes managed servers A, B, and N, 950, 955, and 960. Sever N 960 is shown as a dashed line indicating that sever N can be the server changed (created/started/shut down) as a result of an instruction received from the rules based elasticity module 916. The application server environment additionally includes interceptor framework 1470, which contains a plurality of interceptors arranged in an interceptor chain, including interceptor A 1471, interceptor B 1472, and interceptor C 1476.

In accordance with an embodiment, the arrangement of the interceptor chain in the interceptor framework can be based upon a plurality of ranks, where each rank is associated with an interceptor. For example, rank 1474 can be associated with interceptor A, rank 1475 can be associated with interceptor B, and rank 1476 can be associated with interceptor C. In accordance with an embodiment, the ranks can comprise an HK2 rank annotation.

The various ranks can, in some embodiments, be associated with a position or a priority in an interceptor chain. For example, as depicted in FIG. 14, rank 1474 has a higher priority than rank 1475, which in turn has a higher priority than rank 1476. If the interceptor chain is called on to intercept a method invocation, such as a scaling operation or other HK2 operation, the interceptors can run in an order defined by each interceptor's associated rank. For example, as shown in FIG. 14, interceptor A, which has the highest priority, based on its rank, among the three interceptors, can execute first. If interceptor A passes (i.e., does not throw an exception), then interceptor B, which has the next highest priority based upon its rank, can run. If interceptor B passes (i.e., does not throw an exception), then interceptor C, which has the lowest priority based upon its rank, can run. Once interceptor C runs, and passes (i.e., does not throw an exception), then the interceptor chain has run its course and the interceptor method can proceed to run on its target.

In accordance with an embodiment, if just one interceptor in a chain of interceptors fails (i.e., throws an exception), the entire interceptor chain can fail, which can lead to a canceling of the method invocation.

In accordance with an embodiment, it can sometimes be desired that data can be shared among various interceptors. An Interceptor can typecast a MethodInvocation object to HK2MethodInvocation and then call the getUserData( ) method to have access to a Map<String, Object>. This Map is available for the duration of the method invocation and the same Map instance is made available for each Interceptor that participates in the invocation. A new Map can be created for every MethodInvocation.

Figure 15:
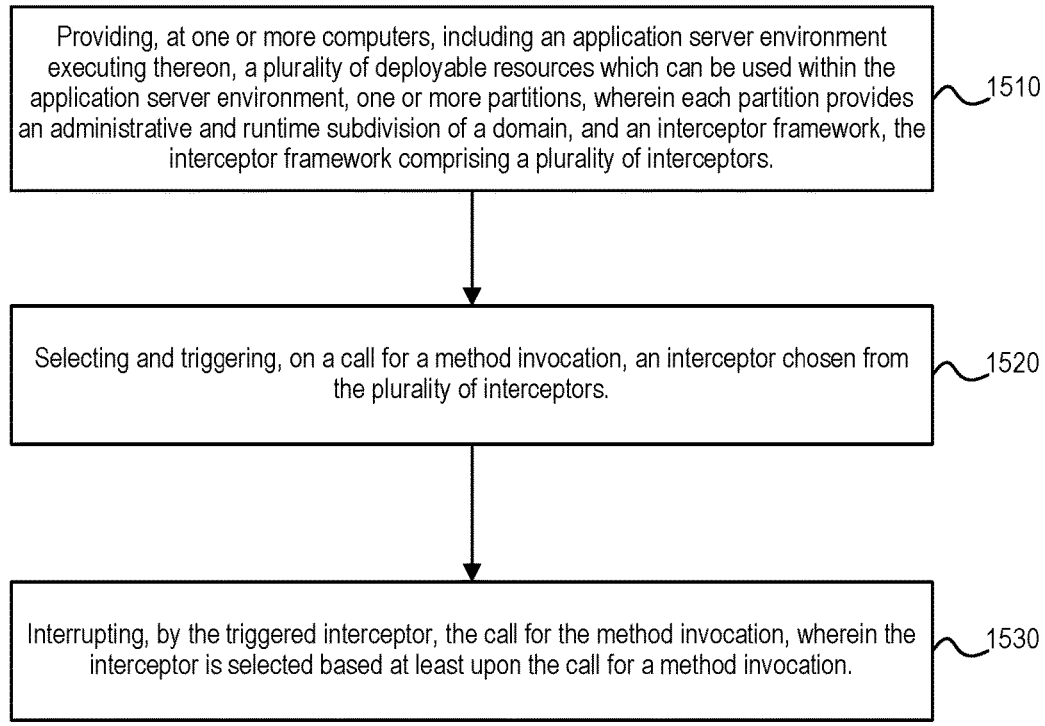
FIG. 15 is a flowchart of an exemplary method for supporting interceptors in an application server environment.

FIG. 15 is a flowchart of an exemplary method for supporting interceptors in an application server environment. At step 1510, the method can provide, at one or more computers, including an application server environment executing thereon, a plurality of deployable resources which can be used within the application server environment, one or more partitions, wherein each partition provides an administrative and runtime subdivision of a domain, and an interceptor framework, the interceptor framework comprising a plurality of interceptors.

At step 1520, the method can select and trigger, on a call for a method invocation, an interceptor chosen from the plurality of interceptors.

At step 1530, the method can interrupt, by the triggered interceptor, the call for the method invocation, wherein the interceptor is selected based at least upon the call for a method invocation.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for supporting interceptors in an application server environment, comprising:
   one or more computers, including an application server environment executing thereon, together with
      a plurality of deployable resources which can be used within the application server environment,
      two or more partitions, wherein each partition provides an administrative and runtime subdivision of a domain,
      a dynamic cluster for use by the two or more partitions, the dynamic cluster comprising an initial number of servers running within the dynamic cluster, and
      an interceptor framework, the interceptor framework comprising a plurality of interceptors;
   wherein the system is configured to select and trigger, on a call for a method invocation, an interceptor chosen from the plurality of interceptors, wherein the method invocation is targeted to dynamic cluster and comprises a scale up method invocation or a scale down method invocation, the scale up action starting at least one managed server within the dynamic cluster, the scale down action stopping at least one managed server within the dynamic cluster;
   wherein the interceptor, once triggered, interrupts the call for the method invocation; and
   wherein the interceptor is selected based at least upon the call for a method invocation.

2. The system of claim 1, further comprising:
   a traffic director; and
   wherein the method invocation comprises a scale up method invocation, the scale up method invocation starting at least one server within the dynamic cluster; and
   wherein the selected and triggered interceptor comprises a traffic director interceptor, the traffic director interceptor configured to allow the traffic director to be informed of the at least one server started within the dynamic cluster.

3. The system of claim 1, further comprising:
   a traffic director; and
   wherein the method invocation comprises a scale down method invocation, the scale down method invocation stopping at least one server of the initial number of servers running within the dynamic cluster; and
   wherein the selected and triggered interceptor comprises a traffic director interceptor, the traffic director interceptor configured to allow the traffic director to be informed of the at least one server stopped within the dynamic cluster.

4. The system of claim 1, further comprising:
   at least one data source, the at least one data source having at least one connection to the dynamic cluster;
   wherein the method invocation comprises a scale up method invocation, the scale up method invocation starting at least one server within the dynamic cluster, the scale up method invocation creating additional connections between the at least one data source and the dynamic cluster;
   wherein the selected and triggered interceptor comprises a data source interceptor, the data source interceptor configured to limit a total number of connections created between the at least one data source and the dynamic cluster so that a capacity of at least one data source is not exceeded.

5. The system of claim 1, wherein the selected and triggered interceptor comprises a chain interceptor, the chain interceptor comprising a plurality of interceptors; and wherein each of the plurality of interceptors that comprise the chain interceptor is associated with a rank; and wherein the rank associated of each of the plurality of interceptors that comprise the chain interceptor determines an order in which the plurality of interceptors that comprise the chain interceptor interrupts the method invocation.

6. The system of claim 1, wherein the application server environment comprises a multi-tenant application server environment, and wherein the system can associate the two or more partitions with a tenant of a plurality of tenants, for use by the tenant.

7. A method for supporting interceptors in an application server environment, comprising:

providing, at one or more computers, including an application server environment executing thereon, a plurality of deployable resources which can be used within the application server environment, two or more partitions, wherein each partition provides an administrative and runtime subdivision of a domain, a dynamic cluster for use by the two or more partitions, the dynamic cluster comprising an initial number of servers running within the dynamic cluster, and an interceptor framework, the interceptor framework comprising a plurality of interceptors;

selecting and triggering, on a call for a method invocation, an interceptor chosen from the plurality of interceptors, wherein the method invocation is targeted to dynamic cluster and comprises a scale up method invocation or a scale down method invocation, the scale up action starting at least one managed server within the dynamic cluster, the scale down action stopping at least one managed server within the dynamic cluster; and interrupting, by the triggered interceptor, the call for the method invocation; and wherein the interceptor is selected based at least upon the call for a method invocation.

8. The method of claim 7 further comprising:

providing a traffic director; and wherein the method invocation comprises a scale up method invocation, the scale up method invocation starting at least one server within the dynamic cluster; and wherein the selected and triggered interceptor comprises a traffic director interceptor, the traffic director interceptor configured to allow the traffic director to be informed of the at least one server started within the dynamic cluster.

9. The method of claim 7, further comprising:

providing a traffic director; and wherein the method invocation comprises a scale down method invocation, the scale down method invocation stopping at least one server of the initial number of servers running within the dynamic cluster; and wherein the selected and triggered interceptor comprises a traffic director interceptor, the traffic director interceptor configured to allow the traffic director to be informed of the at least one server stopped within the dynamic cluster.

10. The method of claim 7, further comprising:

providing at least one data source, the at least one data source having at least one connection to the dynamic cluster;

wherein the method invocation comprises a scale up method invocation, the scale up method invocation starting at least one server within the dynamic cluster, the scale up method invocation creating additional connections between the at least one data source and the dynamic cluster;

wherein the selected and triggered interceptor comprises a data source interceptor, the data source interceptor configured to limit a total number of connections created between the at least one data source and the dynamic cluster so that a capacity of at least one data source is not exceeded.

11. The method of claim 7, wherein the selected and triggered interceptor comprises a chain interceptor, the chain interceptor comprising a plurality of interceptors; and wherein each of the plurality of interceptors that comprise the chain interceptor is associated with a rank; and wherein the rank associated of each of the plurality of interceptors that comprise the chain interceptor determines an order in which the plurality of interceptors that comprise the chain interceptor interrupts the method invocation.

12. The method of claim 7, wherein the application server environment comprises a multi-tenant application server environment, and wherein the system can associate the two or more partitions with a tenant of a plurality of tenants, for use by the tenant.

13. The method of claim 7, further comprising:

further providing a traffic director; and wherein the method invocation comprises a scale down method invocation, the scale down method invocation stopping at least one server within the dynamic cluster; and wherein the selected and triggered interceptor comprises a traffic director interceptor, the traffic director interceptor configured to allow the traffic director override the stopping of the at least one server within the dynamic cluster so long as at least one partition of the two or more partitions is currently utilizing resources provided by the at least one server within the dynamic cluster.

14. A non-transitory computer readable storage medium, including instructions stored thereon for supporting interceptors in an application server environment, which when read and executed by one or more computers cause the one or more computers to perform the steps comprising:

providing, at one or more computers, including an application server environment executing thereon, a plurality of deployable resources which can be used within the application server environment, two or more partitions, wherein each partition provides an administrative and runtime subdivision of a domain, a dynamic cluster for use by the two or more partitions, the dynamic cluster comprising an initial number of servers running within the dynamic cluster, and an interceptor framework, the interceptor framework comprising a plurality of interceptors;

selecting and triggering, on a call for a method invocation, an interceptor chosen from the plurality of interceptors, wherein the method invocation is targeted to dynamic cluster and comprises a scale up method invocation or a scale down method invocation, the scale up action starting at least one managed server within the dynamic cluster, the scale down action stopping at least one managed server within the dynamic cluster; and interrupting, by the triggered interceptor, the call for the method invocation; and wherein the interceptor is selected based at least upon the call for a method invocation.

15. The non-transitory computer readable storage medium of claim 14, the steps further comprising:

providing a traffic director; and wherein the method invocation comprises a scale up method invocation, the scale up method invocation starting at least one server within the dynamic cluster; and wherein the selected and triggered interceptor comprises a traffic director interceptor, the traffic director interceptor configured to allow the traffic director to be informed of the at least one server started within the dynamic cluster.

16. The non-transitory computer readable storage medium of claim 14, the steps further comprising:

providing a traffic director; and wherein the method invocation comprises a scale down method invocation, the scale down method invocation stopping at least one server of the initial number of servers running within the dynamic cluster; and wherein the selected and triggered interceptor comprises a traffic director interceptor, the traffic director interceptor configured to allow the traffic director to be informed of the at least one server stopped within the dynamic cluster.

17. The non-transitory computer readable storage medium of claim 14, the steps further comprising:

further comprising:

providing at least one data source, the at least one data source having at least one connection to the dynamic cluster;

wherein the method invocation comprises a scale up method invocation, the scale up method invocation starting at least one server within the dynamic cluster, the scale up method invocation creating additional connections between the at least one data source and the dynamic cluster;

wherein the selected and triggered interceptor comprises a data source interceptor, the data source interceptor configured to limit a total number of connections created between the at least one data source and the dynamic cluster so that a capacity of at least one data source is not exceeded.

18. The non-transitory computer readable storage medium of claim 14, wherein the selected and triggered interceptor comprises a chain interceptor, the chain interceptor comprising a plurality of interceptors; and wherein each of the plurality of interceptors that comprise the chain interceptor is associated with a rank; and wherein the rank associated of each of the plurality of interceptors that comprise the chain interceptor determines an order in which the plurality of interceptors that comprise the chain interceptor interrupts the method invocation.

\* \* \* \* \*